(12) United States Patent
Park et al.

(10) Patent No.: US 12,067,189 B2
(45) Date of Patent: Aug. 20, 2024

(54) SMART PEN AND DISPLAY DEVICE USING THE SAME

(71) Applicant: SAMSUNG DISPLAY CO., LTD., Yongin-si (KR)

(72) Inventors: Chang Min Park, Gwangmyeong-si (KR); Jin Yong Sim, Seongnam-si (KR); Ivan Maidanchuk, Hwaseong-si (KR); Won Sang Park, Gyeonggi-do (KR); Kyu Shik Shin, Hwaseong-si (KR); Seong Jun Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 119 days.

(21) Appl. No.: 17/809,816

(22) Filed: Jun. 29, 2022

(65) Prior Publication Data

US 2023/0143220 A1   May 11, 2023

(30) Foreign Application Priority Data

Nov. 5, 2021   (KR) .......................... 10-2021-0151260

(51) Int. Cl.
*G06F 3/041* (2006.01)
*G06F 3/0354* (2013.01)
(Continued)

(52) U.S. Cl.
CPC ...... *G06F 3/04162* (2019.05); *G06F 3/03545* (2013.01); *G06F 3/0383* (2013.01);
(Continued)

(58) Field of Classification Search
CPC .. G06F 3/0321; G06F 3/03542; G06F 3/0317; G06F 3/04162; G06F 3/03545;
(Continued)

(56) References Cited

U.S. PATENT DOCUMENTS 6,548,768 B1   4/2003   Pettersson et al.
9,378,444 B2   6/2016   Knee et al.
(Continued)

FOREIGN PATENT DOCUMENTS

| CN | 112527130 | 3/2021 |
| JP | 2013-178137 | 9/2013 |
| JP | 2017-126195 | 7/2017 |

*Primary Examiner* — Temesghen Ghebretinsae
*Assistant Examiner* — Ivelisse Martinez Quiles
(74) *Attorney, Agent, or Firm* — F. Chau & Associates, LLC

(57) ABSTRACT

The present disclosure relates to a smart pen and a display device using the same, in which a reflective light reception rate may be enhanced through a light output structure to increase a code pattern and code information recognition rate of a display panel. According to an embodiment of the disclosure, smart pen comprising a body portion, a pen tip portion formed on one end of the body portion to form a path of light emitted from a light emitting portion in an end direction at one side, a code detector detecting shape data for code patterns by applying light to the pen tip portion and receiving light reflected from a display panel and the pen tip portion, and a code processor generating coordinate data by using the shape data and transmitting the coordinate data to a main processor for driving the display panel.

20 Claims, 24 Drawing Sheets

(51) Int. Cl.
  *G06F 3/038*     (2013.01)
  *G06F 3/042*     (2006.01)
  *G06F 3/0488*    (2022.01)

(52) U.S. Cl.
  CPC .......... *G06F 3/0421* (2013.01); *G06F 3/0488* (2013.01); *G06F 2203/04106* (2013.01)

(58) Field of Classification Search
  CPC ...... G06F 3/042; G06F 3/0383; G06F 3/0421; G06F 3/0488; G06F 2203/04106; G06F 3/0446; G06F 3/0448; G06F 2203/04112; G06F 3/0445; G02B 6/0001; G02B 5/021
  See application file for complete search history.

(56) References Cited

U.S. PATENT DOCUMENTS

| | | | |
|---|---|---|---|
| 2006/0151610 A1 | 7/2006 | Chiang et al. | |
| 2012/0125882 A1* | 5/2012 | Weaver | G03F 7/0002 216/17 |
| 2012/0163026 A1 | 6/2012 | Bohn et al. | |
| 2012/0249490 A1 | 10/2012 | Lee et al. | |
| 2013/0093733 A1* | 4/2013 | Yoshida | G09G 3/30 345/76 |
| 2013/0162605 A1* | 6/2013 | Osakabe | G06F 3/033 345/179 |
| 2013/0321357 A1 | 12/2013 | Yamada et al. | |
| 2014/0267185 A1* | 9/2014 | Arends | G06F 3/03545 345/179 |
| 2015/0123948 A1* | 5/2015 | Yamada | G02F 1/13338 345/175 |

* cited by examiner

FIG. 23

|  | Col1 | Col2 | Col3 | Col4 | Col5 | Col6 |
|---|---|---|---|---|---|---|
| Row1 | 00 | 01 | 01 | 11 | 10 | 11 |
| Row2 | 00 | 01 | Null | 10 | 00 | 10 |
| Row3 | 01 | 01 | 01 | 01 | Null | 10 |
| Row4 | 01 | 10 | 00 | 00 | 01 | 11 |
| Row5 | 01 | 01 | 00 | 10 | 01 | 11 |
| Row6 | 01 | 10 | 11 | 11 | 11 | 01 |

FIG. 25

|  | Col1 | Col2 | Col3 | Col4 | Col5 |  |
|---|---|---|---|---|---|---|
| Data 1 | 1 | 0 | 1 | 1 | 0 | — Row1 |
|  | 1 | 1 | 0 | 1 | 1 | — Row2 |
| Data 2 | 1 | 0 | 1 | 0 | 1 | — Row3 |
|  | 0 | 1 | 1 | 1 | 0 | — Row4 |

| | Col1 | Col2 | Col3 | |
|---|---|---|---|---|
| Data 1 | RP1 | 01 | 10 | Row1 |
| | 01 | 00 | 11 | Row2 |
| Data 2 | RP2 | 11 | 01 | Row3 |
| | 01 | 00 | 10 | Row4 |

RP: RP1, RP2

SMART PEN AND DISPLAY DEVICE USING THE SAME

CROSS-REFERENCE TO RELATED APPLICATION

This application claims priority under 35 U.S.C. § 119 to Korean Patent Application No. 10-2021-0151260, filed on Nov. 5, 2021 in the Korean Intellectual Property Office, the contents of which are herein incorporated by reference in their entirety.

TECHNICAL FIELD

The present disclosure relates to a smart pen and, more particularly, to a smart pen and a display device using the same.

DISCUSSION OF THE RELATED ART

Display devices for displaying images have become a popular element in a wide variety of modern electronic devices. For example, display devices have been incorporated into smart phones, digital cameras, laptop computers, vehicle navigation devices, and smart televisions. The display device may be a flat panel display device such as a liquid crystal display (LCD) device, a field emission display device, a micro light emitting diode (LED) display device, and an organic light emitting diode (OLED) display device. Among the flat panel display devices, light emitting display devices may include light emitting elements in which each pixel of the display panel may self-emit light, thereby displaying an image, even without the use of a backlight unit to provide light.

Many modern display devices incorporate a touch sensor element so as to be able to sense the location of a touch event, such as a touch by a user's finger or a stylus/pen device. Such a touch-screen display device may be able to sense the position of a stylus/pen with greater precision than would be possible when the touch is provided by a finger of the user.

SUMMARY

A smart pen includes a body portion. A pen tip portion is disposed on one end of the body portion and forms a path for light emitted from a light emitting portion. A code detector detects shape data for code patterns by applying light to the pen tip portion and receiving light reflected from a display panel and the pen tip portion. A code processor generates coordinate data by using the shape data and transmits the coordinate data to a main processor for driving the display panel.

The pen tip portion may include a light guide member forming a path for the light emitted from the light emitting portion to emit the light from the pen tip portion. At least one light transmitting port may form a light receiving path for light reflected from a reflective surface of the pen tip portion and the display panel.

The light emitting portion may be disposed on a rear surface of the light guide member to supply light to a light incident surface of the rear surface of the light guide member, thereby allowing the light supplied to the light incident surface to be emitted to a light output surface of a front surface the light guide member through a light path of the light guide member.

The light guide member may include a light path forming portion corresponding to a length of the pen tip portion to form a path for infrared light emitted from the light emitting portion in the end direction of the pen tip portion. A light incident surface may face the light emitting portion in a rear direction of the light path forming portion to allow the light from the light emitting portion to be incident thereupon. The light output surface may diffuse the light, which passes through the light path forming portion, in the end direction of the pen tip portion and may output the light.

The light guide member may include a fixing hole formed on one side of the light output surface.

A length of the light path forming portion may correspond to the length of the pen tip portion. The light path forming portion may correspond to the length direction of the pen tip portion, thereby forming the path of the light emitted from the light emitting portion in the end direction of one side of the pen tip portion.

The smart pen may further include a plurality of optical protrusions formed on the light output surface of the light path forming portion to diffuse and emit the light output through the light output surface.

The plurality of optical protrusions may be formed in a hemispherical shape, as a polypyramid, such as a triangular or square pyramid, as a polyhedron, such as trihedron or tetrahedron, or having an irregular protrusion shape.

The light output surface of the light guide member may have a rectangular shape surface, and the light output through the light output surface may be diffused and output in a rectangular surface light source shape in accordance with a rectangular shape of the light output surface.

The pen tip portion may allow the light reflected from the display panel to be re-reflected on a reflective surface of an inner surface, thereby forming a light receiving path such that the reflective light is received by the light receiving portion of the code detector.

The smart pen may further include a piezoelectric sensor attached to at least one surface of the light guide member, so as to be compressed or relaxed in response to a change in position movement in a front or rear direction of the light guide member.

The rear surface of the light guide member may be supported by an elastic support embedded in the body portion and then compressed in a front direction by the elastic support. The piezoelectric sensor may generate a pressurization sensing signal according to a pressurizing force or relaxation level applied by the position movement of the light guide member and may transmit the pressurization sensing signal to the code processor.

The light guide member may include a plurality of light path forming portions disposed in parallel in the length direction of the pen tip portion to form a path for light generated from a plurality of different light emitting portions. A plurality of light incident surfaces may be disposed on a rear surface of each of the plurality of light path forming portions to form a light incident path such that light generated from the plurality of light emitting portions is incident upon each of the plurality of light path forming portions. A light output surface may be disposed in a front direction of the light path forming portions to condense the light passing through the plurality of light path forming portions and diffuse and output the condensed light in the front direction of the light path forming portions.

The plurality of light emitting portions may be disposed on a lower surface of a fixed substrate embedded in the body portion or the pen tip portion in a direction in which the light guide member is positioned, to apply infrared light to each of the plurality of light incident surfaces, thereby allowing the infrared light incident upon the plurality of light incident surfaces to be output through the light output surface on a front surface through the light path forming portions.

A display device includes a display panel displaying code patterns or including the code patterns inscribed thereon. A main processor controls image display driving of the display panel. A smart pen receives light reflected from the display panel to detect shape data for the code patterns, generate coordinate data according to the shape data, and transmits the coordinate data to the main processor.

The smart pen may include a body portion, a pen tip portion formed on one end of the body portion to form a path for light emitted from a light emitting portion, a code detector detecting the shape data by applying light to the pen tip portion and receiving light reflected from a display panel and the pen tip portion, and a code processor generating coordinate data and transmitting the coordinate data to the main processor.

The pen tip portion may include a light guide member forming a path of the light emitted from the light emitting portion to emit the light from of the pen tip portion. At least one light transmitting port forms a light receiving path of light reflected from a reflective surface of the pen tip portion and the display panel.

The display panel may include a plurality of touch electrodes sensing a touch, and at least a portion of the plurality of touch electrodes may include a code pattern portion in which the code patterns are disposed.

The code processor may extract or generates data codes corresponding to a structure and shape of the code patterns through a memory, combine the data codes, and extract or generate coordinate data corresponding to the combined data codes.

The memory may store the data codes and the coordinate data according to combination of the data codes and may share the data codes respectively corresponding to the shape data and the code patterns, and the coordinate data according to combination of the data codes with the code processor.

BRIEF DESCRIPTION OF THE DRAWINGS

The above and other aspects and features of the present disclosure will become more apparent by describing in detail embodiments thereof with reference to the attached drawings, in which:

FIG. 23 is a view illustrating a data code corresponding to the code pattern portion of FIG. 22;

FIG. 25 is a view illustrating a data code corresponding to the code pattern portion of FIG. 24;

FIG. 27 is a view illustrating a data code corresponding to the code pattern portion of FIG. 26.

DETAILED DESCRIPTION OF THE DISCLOSURE

The present invention will now be described more fully hereinafter with reference to the accompanying drawings, in which various embodiments of the invention are shown. This invention may, however, be embodied in different forms and should not necessary be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and drawings.

It will be understood that, although the terms "first," "second," etc. may be used herein to describe various elements, these elements should not necessarily be limited by these terms. These terms might only used to distinguish one element from another element. For instance, a first element discussed below could be termed a second element without departing from the teachings of the present invention. Similarly, the second element could also be termed the first element. Each of the features of the various embodiments of the present disclosure may be combined or combined with each other, in part or in whole, and technically various interlocking and driving are possible. Each embodiment may be implemented independently of each other or may be implemented together in an association.

Hereinafter, detailed embodiments of the present disclosure will be described with reference to the accompanying drawings.

Figure 1:
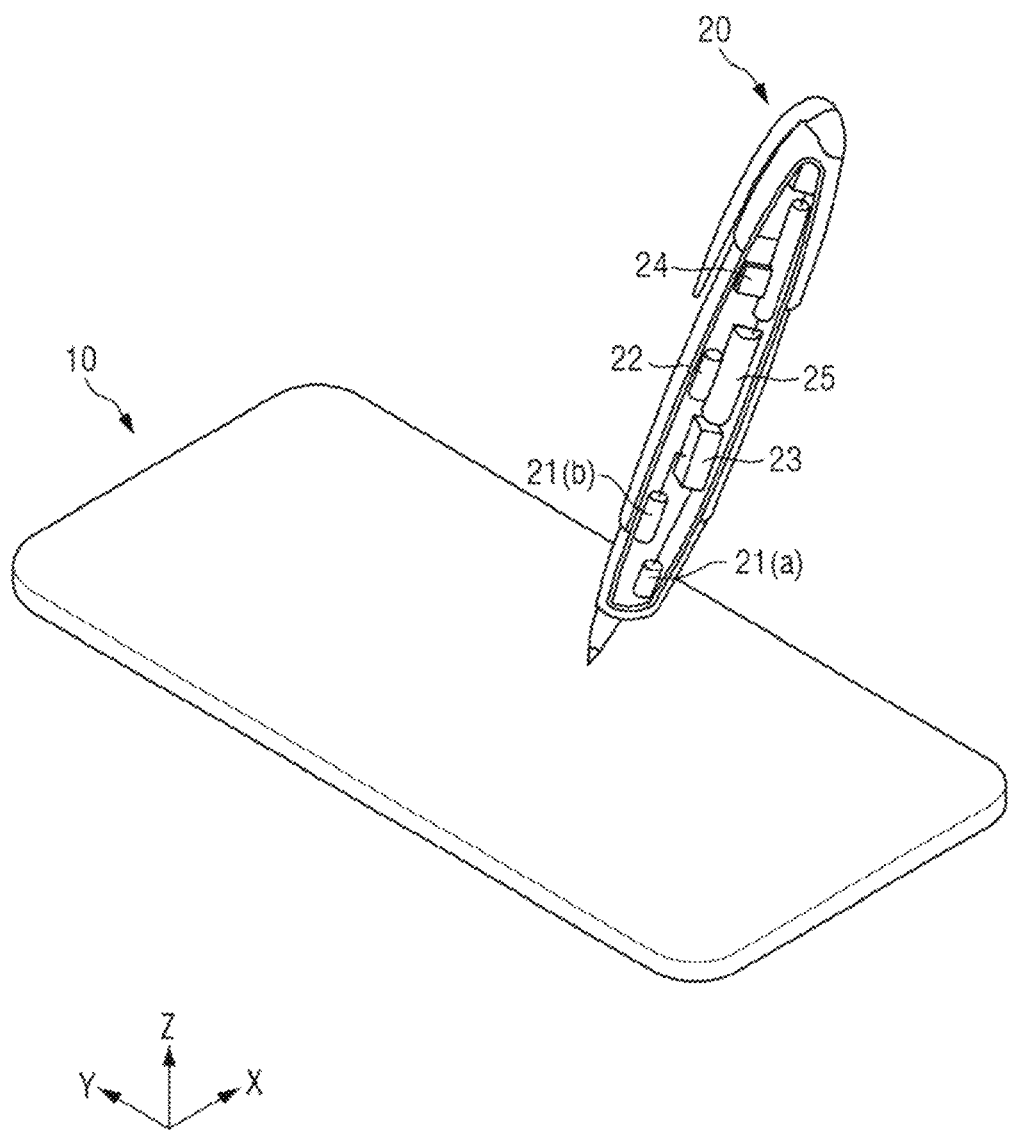
FIG. 1 is a schematic view illustrating a smart pen and a display device according to an embodiment of the present disclosure.
Figure 2:
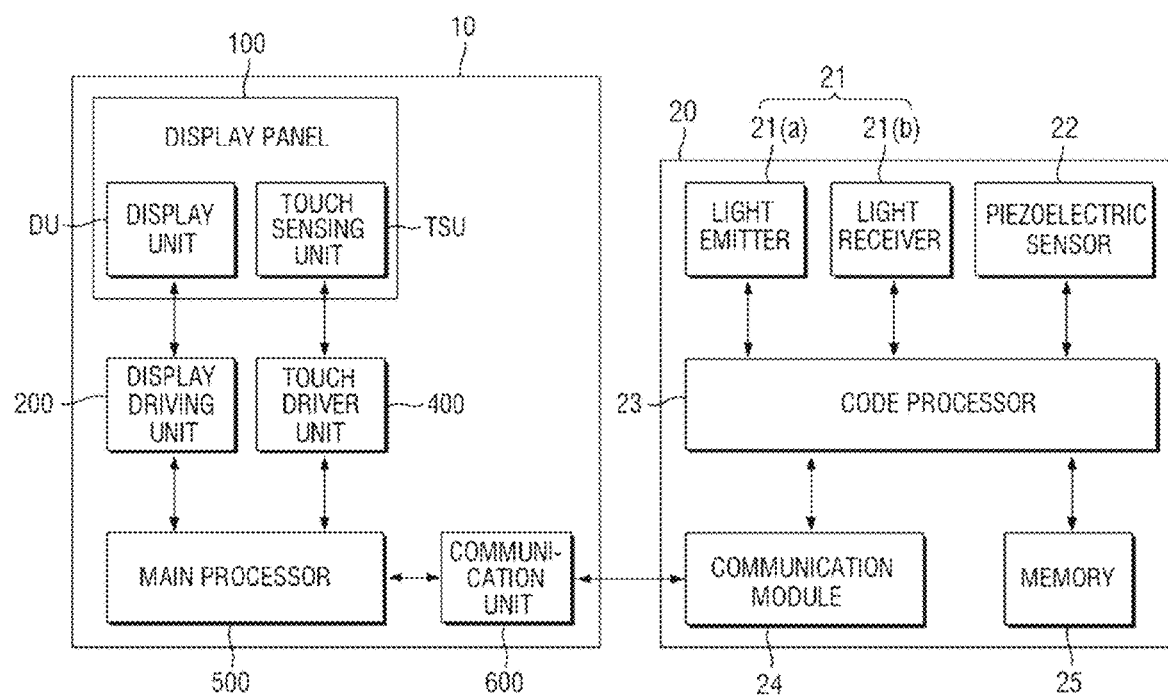
FIG. 2 is a detailed schematic block view illustrating the smart pen and the display device, which are shown in FIG. 1.

FIG. 1 is a layout view illustrating a smart pen and a display device according to an embodiment of the present disclosure. FIG. 2 is a detailed schematic block view illustrating the smart pen and the display device, which are shown in FIG. 1.

Referring to FIGS. 1 and 2, a display device 10 includes a display panel 100, a display driver 200 (e.g., a display driving unit), a touch driver 400 (e.g., a touch driver unit), a main processor 500, and a communication unit 600. A smart pen 20 includes a code detector 21, a piezoelectric sensor 22, a code processor 23, a communication module 24, and a memory 25. A body portion and a pen tip portion of the smart pen 20, which constitute an overall encasement of the smart pen 20, may be formed in a shape of a writing instrument such as a fountain pen.

The smart pen 20 is a stylus or an electronic pen for sensing light of the display panel 100 or light reflected from the display panel 100 using an optical method, and may detect a code pattern included in the display panel 100 based on the sensed light and generate coordinate data therefrom. The smart pen 20 may be an electronic pen in a shape of a writing instrument, but is not necessarily limited to a writing instrument type or structure.

The display device 10 uses the smart pen 20 as a touch input tool. The display panel 100 of the display device 10 may include a display unit DU for displaying an image, and a touch sensing unit TSU for sensing a touch, such as by a finger of a user, and the smart pen 20. The display unit DU may include a plurality of pixels and may display an image through the plurality of pixels. The display unit DU may display an image, in which code patterns are included, through the plurality of pixels. Alternatively, the code patterns may be inscribed upon the display unit DU.

The touch sensing unit TSU may include a plurality of touch electrodes to sense a touch of a user in a capacitance manner. In this case, at least a portion of the plurality of touch electrodes may include a code pattern portion to sense a touch of the smart pen 20.

The code pattern portion of the display panel 100 may include code patterns formed in accordance with a reference to form a specific code for communicating position information. The code patterns may correspond to a value of a preset data code. A detailed structure of touch sensing unit TSU including display panel 100, and a detailed structure of the code pattern portion and the code patterns will be described later in more detail with reference to the accompanying drawings. The code patterns may be formed by a printing, cutting, or otherwise altering a structure of the display panel 100 in a particular manner, although each of these approaches for inscribing the code patterns may be referred to herein as "inscribed."

The display driver 200 may output signals and voltages for driving the display unit DU. The display driver 200 may supply data voltages to data lines. The display driver 200 may supply a power voltage to a power line and may supply gate control signals to the gate driver.

The touch driver 400 may be connected to the touch sensing unit TSU. The touch driver 400 may supply a touch driving signal to the plurality of touch electrodes of the touch sensing unit TSU and may sense a change in capacitance between the plurality of touch electrodes. The touch driver 400 may calculate a touch input and touch coordinates of a user based on the amount of change in capacitance between the plurality of touch electrodes.

The main processor 500 may control the functions of the display device 10. For example, the main processor 500 may supply digital video data to the display driver 200 so that the display panel 100 displays an image. For example, the main processor 500 may receive touch data from the touch driver 400 to determine the touch coordinates of the user, generate the digital video data according to the touch coordinates or execute an application indicated by an icon displayed on the touch coordinates of the user. For an example, the main processor 500 may receive coordinate data from the smart pen 20 to determine the touch coordinates of the smart pen 20, generate digital video data according to the touch coordinates or execute an application indicated by an icon displayed on the touch coordinates of the smart pen 20.

The communication unit 600 may perform wired/wireless communication with an external device. For example, the communication unit 600 may transmit and receive communication signals to and from the communication module 24 of the smart pen 20. The communication unit 600 may receive coordinate data comprised of data codes from the smart pen 20 and may provide the coordinate data to the main processor 500.

Referring to FIG. 2, the code detector 21 of the smart pen 20 is adjacent to the pen tip portion of the smart pen 20 and senses the code pattern portion included in the display panel 100 of the display device 10. For example, the code detector 21 includes a light emitting portion 21(a) emitting infrared light using at least one infrared light source, and a light receiving portion 21(b) detecting the infrared light reflected from the code patterns of the code pattern portion through an infrared camera.

At least one infrared light source module included in the light emitting portion 21(a) may be comprised of an infrared LED array. The infrared camera of the light receiving portion 21(b) may include a filter for blocking a wavelength band other than infrared rays and allowing the infrared rays to pass therethrough, a lens system for focusing the infrared rays that have passed through the filter, and an optical image sensor for converting an optical image formed by the lens system into an electrical image signal and outputting the image signal. The optical image sensor may be comprised of an array in the same manner as the infrared LED array to provide shape data of the code patterns to the code processor 23 in accordance with to an infrared shape reflected from the code patterns of the code pattern portion. In this way, the code detector 21 of the smart pen 20 may continuously detect the code pattern portion included in at least some areas of the touch sensing unit TSU in accordance with the control and movement of the user and may continuously generate the shape data of the code patterns to provide the generated shape data to the code processor 23.

The piezoelectric sensor 22 is embedded in the smart pen 20 and detects whether the pen tip portion of the smart pen 20 is in contact with the display panel 100 as such contact generates pressure that the piezoelectric sensor 22 can sense. The piezoelectric sensor 22 senses a pressure applied to the pen tip portion of the smart pen 20 and transmits a pressurization sensing signal according to a magnitude of the pressure applied to the pen tip portion, to the code processor 23.

The code processor 23 may determine the time when the pressurization sensing signal is input through the piezoelectric sensor 22 as the time when the smart pen 20 is used. When the pressurization sensing signal is input from the piezoelectric sensor 22, the code processor 23 may continuously receive the shape data of the code pattern portion from the code detector 21. For example, the code processor 23 may continuously receive the shape data for code patterns included in the code pattern portion and may identify a structure and shape of the code patterns. The code processor 23 may extract or generate data codes corresponding to the structure and shape of the coat patterns and may combine the data codes to extract or generate coordinate data corresponding to the combined data codes. The code processor 23 may transmit the generated coordinate data to the display device 10 through the communication module 24. In particular, the code processor 23 may quickly generate coordinate data without complex calculation and correction by receiving the shape data of the code pattern portion and generating and converting the data codes respectively corresponding to the code patterns.

The communication module 24 may perform wired/wireless communication with an external device. For example, the communication module 24 may transmit and receive a communication signal to and from the communication unit 600 of the display device 10. The communication module 24 may receive the coordinate data comprised of data codes from the code processor 23 and provide the coordinate data to the communication unit 600 of the display device 10.

The memory 25 may store data required for driving the smart pen 20. The shape data of the code patterns and the data codes respectively corresponding to the shape data and the code patterns are stored in the memory 25. In addition, the data codes and the coordinate data, according to the combination of the data codes, are stored in the memory 25. The memory 25 shares the data codes respectively corresponding to the shape data and the code patterns, and the coordinate data according to the combination of the data codes with the code processor 23. Therefore, the code processor 23 may combine the data codes stored in the memory 25 through the coordinate data and may extract or generate the coordinate data corresponding to the combined data codes.

Figure 3:
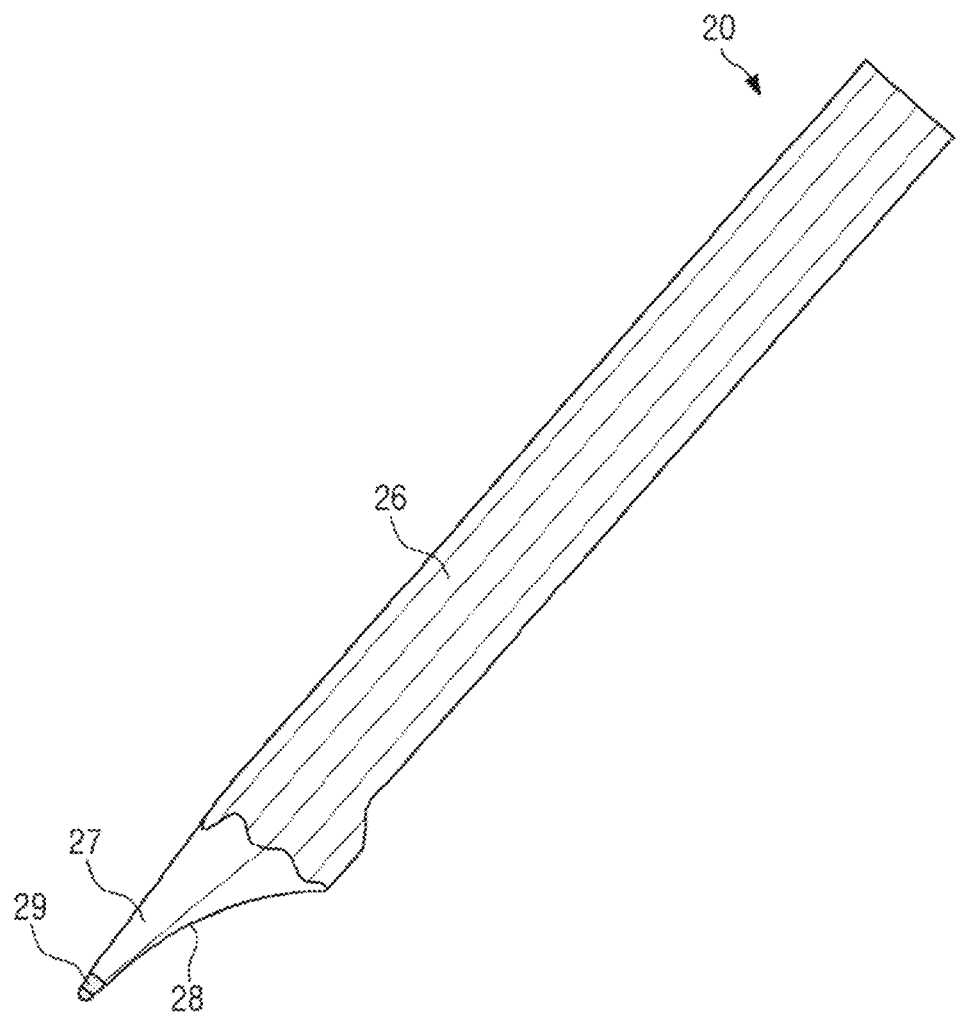
FIG. 3 is a detailed side view illustrating the smart pen shown in FIGS. 1 and 2.

FIG. 3 is a detailed side view illustrating the smart pen shown in FIGS. 1 and 2.

Referring to FIG. 3, the smart pen 20 includes a body portion 26 that is an exterior encasement of the smart pen 20 and thereby constitutes an overall appearance thereof, and a pen tip portion 27 disposed at one end of the body portion 26 or integrally formed with the body portion 26, whereby the smart pen 20 may be formed in a shape of a writing instrument similarly to an electronic pen.

The body portion 26 may have a long bar shape so as to act as a handle for the smart pen 20, whereby an overall appearance of the body portion 26 may be formed in a shape of a writing instrument.

The pen tip portion 27 is formed at one end of the body portion 26 in a length direction of the body portion 26, and a pen tip 29 supporting the pen tip portion 27 and the body portion 26 may be formed or assembled at one end of the pen tip portion 27 during contact with the display panel 100.

The pen tip portion 27 emits light from the light emitting portion 21(a) toward the display panel 100 and forms a light receiving path (or path of reflective light) reflected from the display panel 100. For example, the pen tip portion 27 allows the light displayed on the display panel 100 and the light reflected from the display panel 100 to be re-reflected by a reflective surface 28 of an inner surface of the pen tip portion 27 without being lost by a light reflective surface or a light reflective angle, thereby being received by the code detector 21. Therefore, the pen tip portion 27 may increase light receiving efficiency of the code detector 21.

To increase light reflective efficiency of the pen tip portion 27, a shape of the reflective surface 28 of the inner surface of the pen tip portion 27 may be formed in an inverted triangular shape or any polygonal shape that is different from the inverted triangular shape. Also, the shape of the reflective surface 28 of the inner surface of the pen tip portion 27 may be formed in a circular or oval shape. FIG. 3 shows an example in which the shape of the reflective surface 28 of the inner surface of the pen tip portion 27 is formed in an inverted triangular shape. For example, the pen tip portion 27 may be formed at one end of the body portion 26 in a pen tip shape of a fountain pen.

Figure 4:
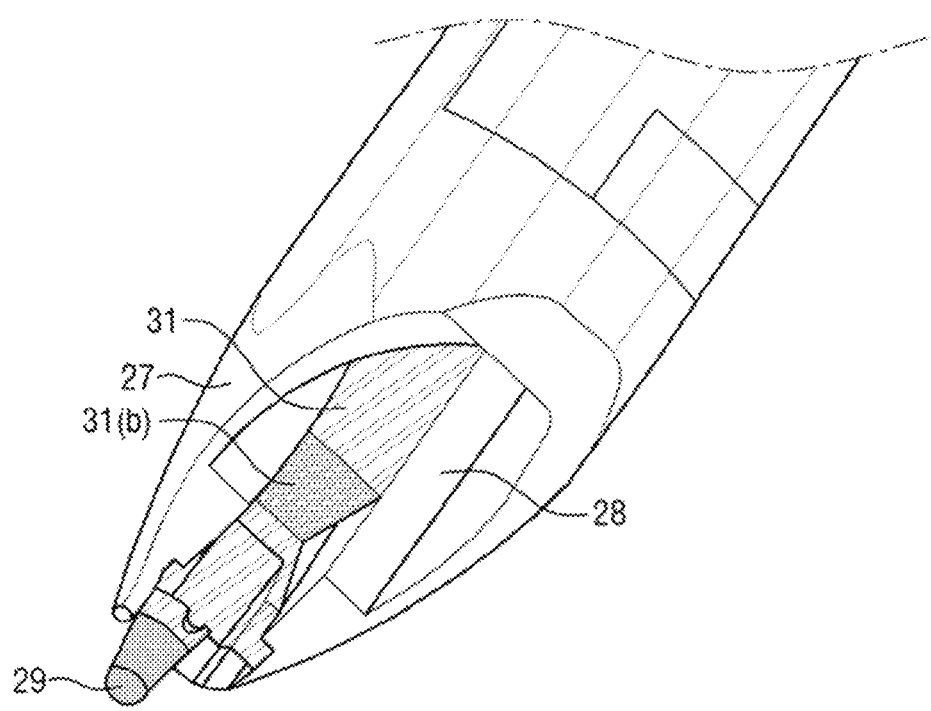
FIG. 4 is a detailed rear perspective view illustrating a structure of a pen tip portion of a smart pen according to an embodiment of the present disclosure.
Figure 5:
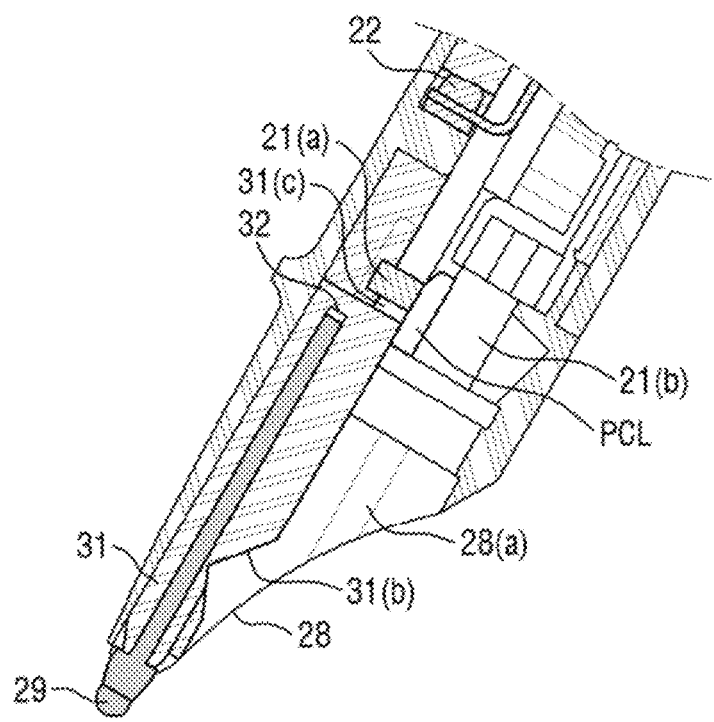
FIG. 5 is a detailed cross-sectional view illustrating a structure of a pen tip portion of a smart pen according to an embodiment of the present disclosure.

FIG. 4 is a detailed rear perspective view illustrating a structure of a pen tip portion of a smart pen according to an embodiment of the present disclosure. FIG. 5 is a detailed cross-sectional view illustrating a structure of a pen tip portion of a smart pen according to an embodiment of the present disclosure.

Referring to FIGS. 4 and 5, the pen tip portion 27 formed in a pen tip shape includes a light guide member 31 forming a path of infrared light emitted from the light emitting portion 21(a) to output the infrared light to a light output surface 31(b) in an end direction at one side of the pen tip portion 27, and at least one light transmitting port 28(a) forming a light receiving path of reflective light reflected from the reflective surface 28 of the pen tip portion 27 and the display panel 100. The at least one light transmitting port 28(a) is formed at the center inside the pen tip portion 27 in a shape of a through hole.

The light emitting portion 21(a) is packaged on an upper surface of a fixed substrate PCL embedded in the body portion 26 or the pen tip portion 27 and is disposed on a rear surface of the light guide member 31 in a direction of the light guide member 31. Therefore, the light emitting portion 21(a) emits infrared light to a light incident surface 31(c) on the rear surface of the light guide member 31. The infrared light incident upon the light incident surface 31(c) on the rear surface is output through the light output surface 31(b) in a front direction of the light guide member 31 through the light guide member 31. A fixing hole 32, into which the pen tip 29 is assembled and fixed, may be further formed on one side in the front direction of the light guide member 31.

The light receiving portion 21(b) of the code detector 21 is embedded in the body portion 26, and the light receiving portion 21(b) is reflected from the reflective surface 28 of the pen tip portion 27 and the display panel 100 to receive the infrared light incident through the light transmitting port 28(a). Therefore, the light receiving portion 21(b) may detect the shape data for the code patterns through the received infrared light.

Figure 6:
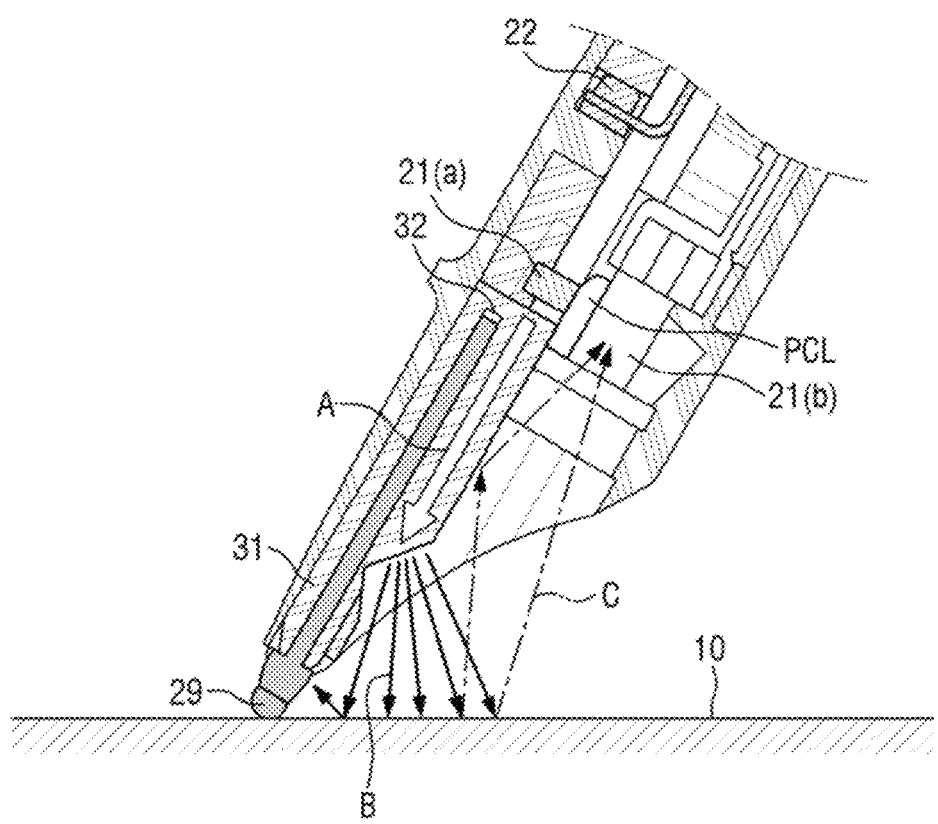
FIG. 6 is a perspective view illustrating a light reflective shape of the pen tip portion shown in FIGS. 4 and 5.

FIG. 6 is a perspective view illustrating a light reflective shape of the pen tip portion shown in FIGS. 4 and 5.

As shown in FIG. 6, the infrared light (light of arrow A) emitted from the light emitting portion 21(a) of the code detector 21 may be output (light of arrow B) though the light output surface 31(b) in an end direction of the light guide member 31 through the light guide member 31, and may be reflected from the display panel 100, etc. When the light is emitted to the display panel 100 through the light guide member 31 or the light displayed on the display panel 100 is received in a state that the smart pen 20 is inclined at a predetermined angle, the light may be diffusely reflected or lost on the surface of the display panel 100 due to a direction difference between an incident angle and a reflective angle with the display panel 100. However, the reflective surface 28 of the pen tip portion 27 covers one side of the display panel 100, so that the reflective light (light of arrow C) reflected from the display panel 100 and the reflective surface 28 of the pen tip portion 27 may be received by the light receiving portion 21(b) of the code detector 21 through the light transmitting port 28(a) of the pen tip portion 27 without being lost.

To enhance reflective efficiency of the pen tip portion 27 and the reflective surface 28, the reflective surface 28 of the pen tip portion 27 may be formed of an infrared reflector such as barium sulfate or magnesium oxide or may be formed in a shape in which the infrared reflector is coated.

Figure 7:
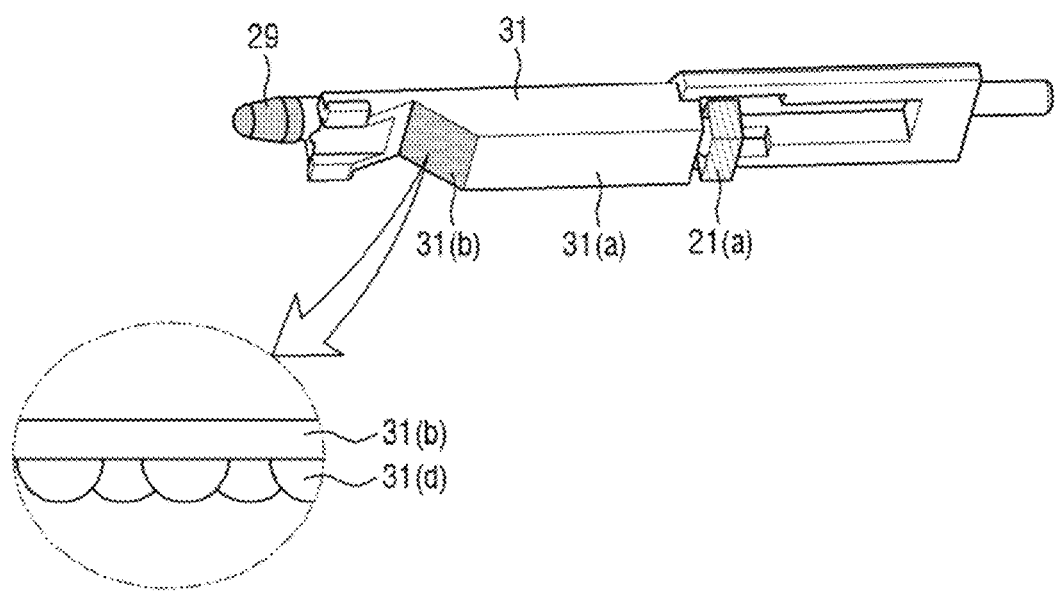
FIG. 7 is a detailed perspective view illustrating a structure of a light guide member and a light output surface, which are shown in FIGS. 4 and 5.
Figure 8:
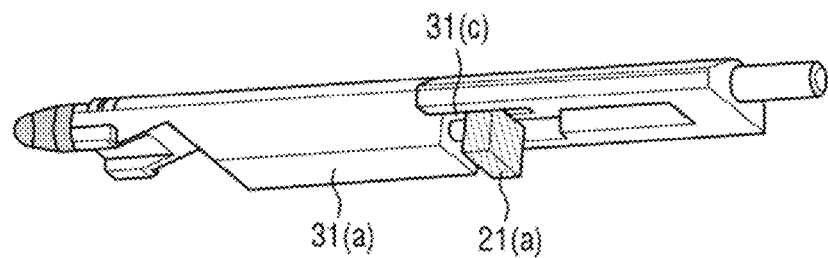
FIG. 8 is a detailed side perspective view illustrating an arrangement structure of a light guide member and a light emitting portion, which are shown in FIGS. 4 and 5.

FIG. 7 is a detailed perspective view illustrating a structure of a light guide member and a light output surface, which are shown in FIGS. 4 and 5. FIG. 8 is a detailed side perspective view illustrating an arrangement structure of a light guide member and a light emitting portion, which are shown in FIGS. 4 and 5.

Referring to FIGS. 7 and 8, the light guide member 31 includes a light path forming portion 31(a) constituting a body, a light incident surface 31(c) upon which light from the light emitting portion 21(a) is incident, a light output surface 31(b) diffusing and outputting light passing through the light path forming portion 31(a), and a fixing hole 32 into which the pen tip 29 is assembled.

A length of the light path forming portion 31(a) may correspond to that of the pen tip portion 27. The light path forming portion 31(a) corresponds to the length direction of the pen tip portion 27, whereby a path of the infrared light emitted from the light emitting portion 21(a) is formed in an end direction of a front surface of the pen tip portion 27.

In a rear direction of the light path forming portion 31(a), the light incident surface 31(c) facing the light emitting portion 21(a) is formed, so that the infrared light emitted from the light emitting portion 21(a) of the rear surface of the light path forming portion 31(a) is incident upon the light incident surface 31(c) of the light path forming portion 31(a).

A plurality of optical protrusions 31(d) are formed on the light output surface 31(b) on the front surface of the light path forming portion 31(a) so that the light output through the optical protrusions 31(d) of the light output surface 31(b) is diffused. Therefore, the light that is incident upon the light incident surface 31(c) and passes through the light path forming portion 31(a) is output in the form of being diffused from the light output surface 31(b) on the front surface of the pen tip portion 27. The plurality of optical protrusions 31(d) may be formed in various shapes such as a hemispherical shape, a polypyramid such as a triangular or square pyramid, a polyhedron such as trihedron or tetrahedron, irregular-shaped protrusions and the like. Hereinafter, a plurality of optical protrusions 31(d) formed in a hemispherical shape will be described by way of example, but the present disclosure is not necessarily limited thereto and may be applied in various shapes.

The fixing hole 32 into which the pen tip 29 is assembled and fixed is formed on one side of the light output surface 31(b), so that the pen tip 29 is assembled and fixed in the end direction of the pen tip portion 27.

Figure 9:
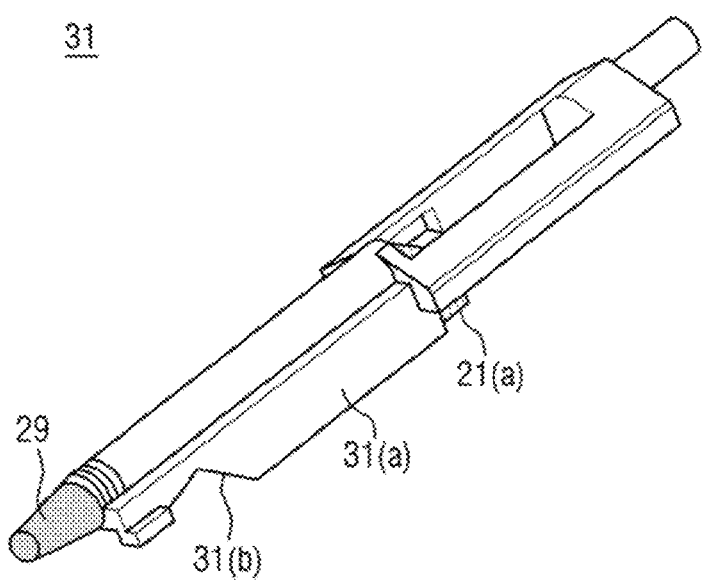
FIG. 9 is a detailed perspective view illustrating a structure of a light guide member and a pen tip, which are shown in FIGS. 4 and 5.

FIG. 9 is a detailed perspective view illustrating a structure of a light guide member and a pen tip, which are shown in FIGS. 4 and 5.

Referring to FIG. 9, the pen tip 29 for supporting the pen tip portion 27 and the body portion 26 may be at one end of the pen tip portion 27 during contact with the display panel 100.

The pen tip 29 of the pen tip portion 27 may be integrally formed with the light guide member 31 during a mold process, injection molding or electroforming of the light guide member 31. For example, the pen tip 29 and the light guide member 31 may be part of a single continuous structure.

Figure 10:
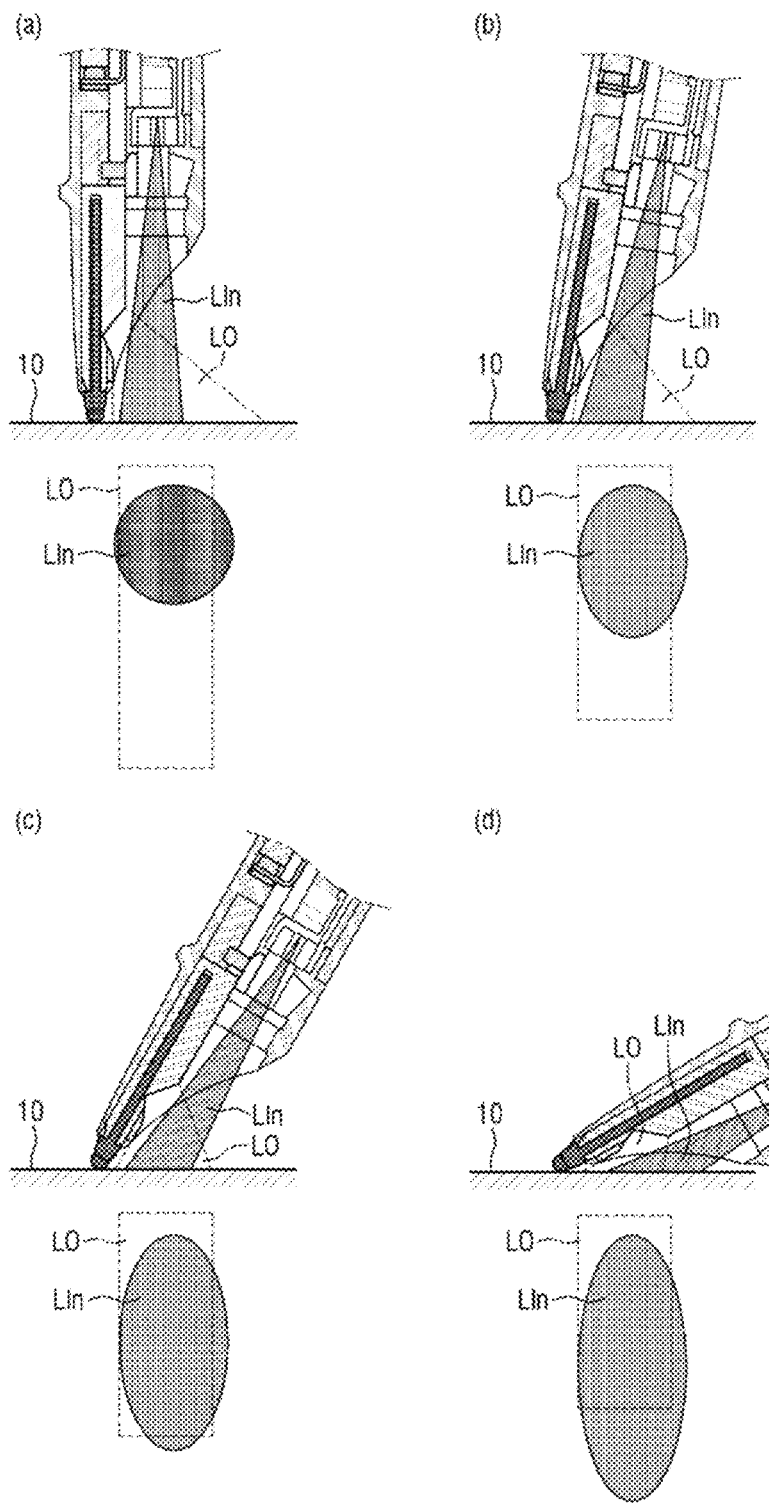
FIG. 10 is a detailed cross-section schematic view illustrating light reflection and light receiving types based on a slope of a smart pen.

FIG. 10 is a detailed cross-section schematic view illustrating light reflection and light receiving types based on a slope of a smart pen.

Referring to FIG. 10(a), the smart pen 20 is disposed in the display device 10 at an angle of about 90° so as to output infrared light to the display device 10 and receive light reflected in the front direction of the display device 10.

When the smart pen 20 is disposed in the display device 10 at an angle of about 90°, light LO output to the display device 10 through the light output surface 31(b) of the light guide member 31 may be diffused and output in a rectangular surface light source shape in accordance with a rectangular shape of the light output surface 31(b).

The light receiving portion 21(b) of the smart pen 20 may receive reflective light reflected from a front area LIn of the light receiving portion 21(b). When the smart pen 20 is disposed in the display device 10 at an angle of about 90°, the front area LIn of the light receiving portion 21(b) may be minimized. However, since an output surface of the light output through the light output surface 31(b) of the light guide member 31 is diffused, the light receiving portion 21(b) may receive more of the reflective light.

In FIG. 10(b), infrared light is output to the display device 10 in a state that the smart pen 20 is inclined at an angle of about 60° with respect to the display device 10, and light reflected at an angle of about 60° of the display device 10 is received.

When the smart pen 20 is disposed in the display device 10 at an inclined angle of about 60°, light LO output through the light output surface 31(b) of the light guide member 31 may be diffused and output in a rectangular plane shape in accordance with the rectangular shape of the light output surface 31(b). However, as a slope of the smart pen 20 becomes narrower, the output area of the light output from the light output surface 31(b) in the rectangular shape may be narrower.

The light receiving portion 21(b) of the smart pen 20 receives the reflective light reflected from the front area LIn of the light receiving portion 21(b). When the smart pen 20 is inclined at an angle of about 60° with respect to the display device 10, the front area LIn of the light receiving portion 21(b) may be wider in inverse proportion to the slope. In this way, even though the light output area of the light output from the light output surface 31(b) in the rectangular shape becomes narrower, since the front area LIn of the light receiving portion 21(b) becomes wider, the light receiving portion 21(b) may receive a large amount of the reflective light without lowering a light receiving rate.

In FIG. 10(c), infrared light is output to the display device 10 in a state that the smart pen 20 is inclined at an angle of about 45° with respect to the display device 10, and light reflected at an angle of about 45° of the display device 10 is received.

When the smart pen 20 is disposed in the display device 10 at an inclined angle of about 45°, light LO output through the light output surface 31(b) of the light guide member 31 may be diffused and output in a rectangular surface light source shape in accordance with the rectangular shape of the light output surface 31(b). As described above, the narrower the slope of the smart pen 20 is, the narrower the output area of the light output from the light output surface 31(b) in the rectangular shape may be.

When the smart pen 20 is inclined at an angle of about 45° with respect to the display device 10, the front area LIn of the light receiving portion 21(b) may be wider in inverse proportion to the slope. In this way, even though the light output area of the light output from the light output surface 31(b) becomes narrower, since the front area LIn which is the light receiving area of the light receiving portion 21(b) becomes wider, the light receiving portion 21(b) may receive a large amount of the reflective light without lowering a light receiving rate.

In FIG. 10(d), infrared light is output to the display device 10 in a state that the smart pen 20 is inclined at an angle of about 30° with respect to the display device 10, and light reflected at an angle of about 30° of the display device 10 is received.

When the smart pen 20 is disposed in the display device 10 at an inclined angle of about 30°, as described above, the narrower the slope of the smart pen 20 is, the narrower the output area of the light output from the light output surface 31(b) in the rectangular shape may be.

When the smart pen 20 is inclined at an angle of about 30° with respect to the display device 10, the front area LIn of the light receiving portion 21(b) may be wider in inverse proportion to the slope. In this way, even though the light output area of the light output from the light output surface 31(b) becomes narrower, since the front area LIn which is the light receiving area of the light receiving portion 21(b) becomes wider, the light receiving portion 21(b) may receive a large amount of the reflective light without lowering a light receiving rate.

Figure 11:
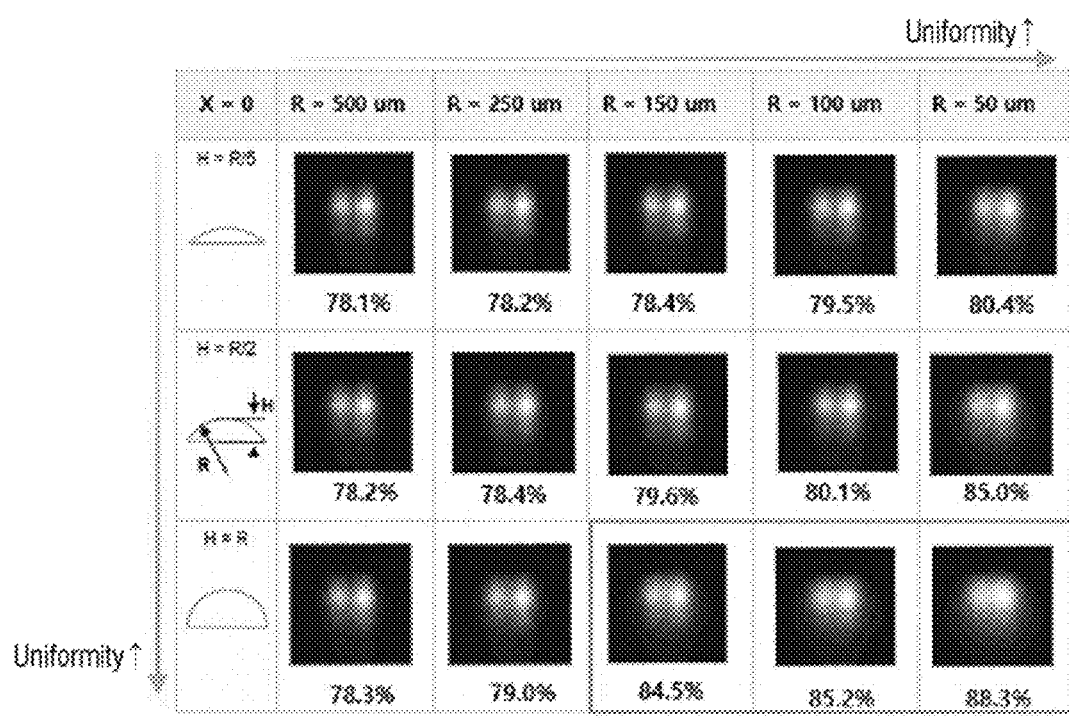
FIG. 11 is a view illustrating light receiving efficiency based on a structure of a light output surface and protrusions of a light guide member shown in FIG. 7.

FIG. 11 is a view illustrating light receiving efficiency based on a structure of a light output surface and protrusions of a light guide member shown in FIG. 7.

Referring to FIG. 11, the light output efficiency of the light output surface 31(b) and the light receiving efficiency of the light receiving portion 21(b) may be varied depending on structural features such as shape, size, height, etc. of the optical protrusions 31(d) formed on the light output surface 31(b) of the light guide member 31.

According to a prophetic example, as a height H of the plurality of optical protrusions 31(d) formed in a hemispherical shape is increased, the light output efficiency of the light output surface 31(b) and the light receiving efficiency of the light receiving portion 21(b) may be increased. Further, as a diameter of the plurality of optical protrusions 31(d) formed in a hemispherical shape becomes smaller, the light output efficiency of the light output surface 31(b) and the light receiving efficiency of the light receiving portion 21(b) may be increased. In particular, when the height H of the plurality of optical protrusions 31(d) formed in a hemispherical shape is enhanced and the diameter of the optical protrusions 31(d) is similar to or the same as the height H thereof, the light output efficiency of the light output surface 31(b) and the light receiving efficiency of the light receiving portion 21(b) may be increased in an optimized state.

Figure 12:
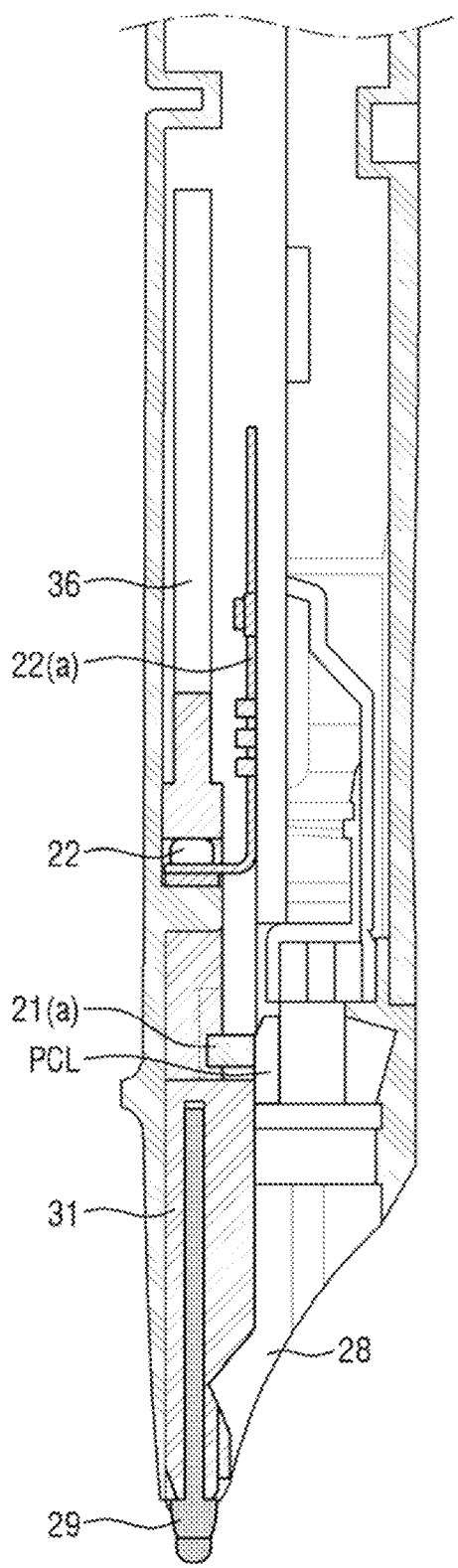
FIG. 12 is a detailed cross-sectional view illustrating an arrangement structure of a pen tip portion and a piezoelectric sensor of a smart pen according to an embodiment of the present disclosure.

FIG. 12 is a detailed cross-sectional view illustrating an arrangement structure of a pen tip portion and a piezoelectric sensor of a smart pen according to an embodiment of the present disclosure.

Referring to FIG. 12, the light guide member 31, into which the pen tip 29 is fixed, is disposed inside the pen tip portion 27, and the rear surface of the light guide member 31 may be supported by an elastic support 36 embedded in the body portion 26. The light guide member 31 may be compressed in the front direction by the elastic support 36 that supports the rear surface of the light guide member 31. Therefore, when the pen tip 29 of the smart pen 20 is in contact with the display panel 100 as a user uses the smart pen 20, a pressure is applied to the light guide member 31 including the pen tip 29 in a rear direction.

The piezoelectric sensor 22 is in contact with at least one surface of the light guide member 31 in a front or rear direction in a state of being packaged on a signal transmission pad 22(a) to sense the pressure applied to the light guide member 31 in accordance with a change in position movement of the light guide member 31. For example, the piezoelectric sensor 22 may be attached to at least one surface of the light guide member 31 so that the piezoelectric sensor 22 may be compressed or relaxed in response to the change in the position movement in the front or rear direction of the light guide member 31. Therefore, the piezoelectric sensor 22 may generate a pressurization sensing signal according to the pressurizing force or relaxation level applied by the position movement of the light guide member 31 and transmit the pressurization sensing signal to the code processor 23. The piezoelectric sensor 22 may be directly in contact with any one surface of the guide member 31 without being connected to another physical structure so as to detect the pressurizing force according to the position movement of the light guide member 31, thereby further enhancing detection sensitivity of the pressurization sensing signal.

Figure 13:
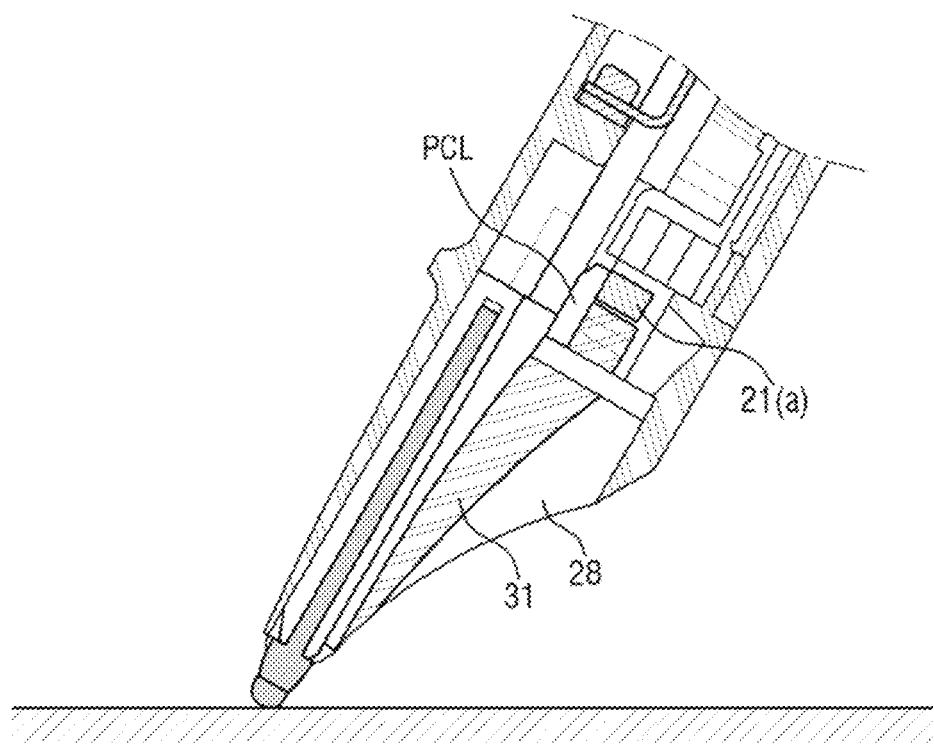
FIG. 13 is a detailed cross-sectional view illustrating a structure of a pen tip portion of a smart pen according to an embodiment of the present disclosure.
Figure 14:
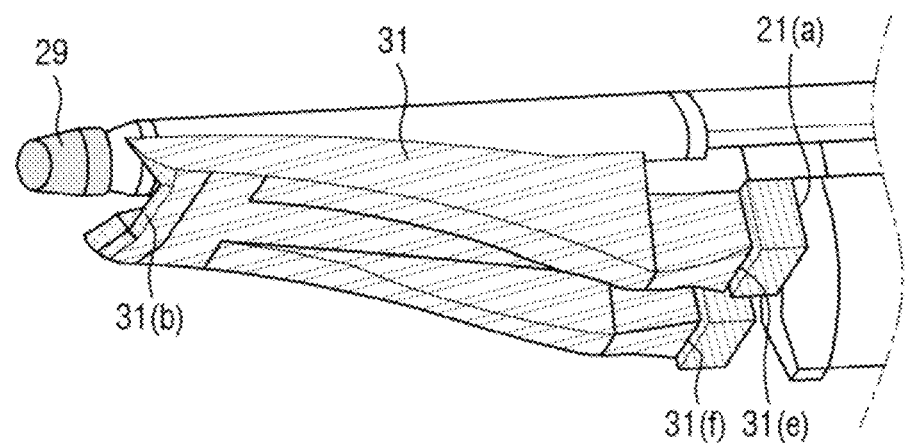
FIG. 14 is a detailed perspective view illustrating a structure of a light guide member and a light output surface, which are shown in FIG. 13.
Figure 15:
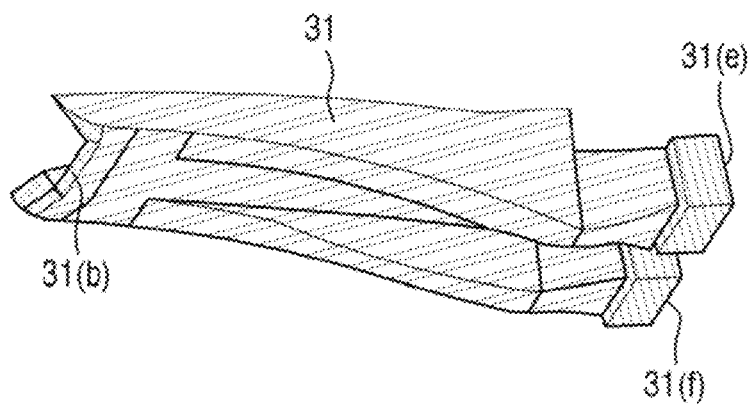
FIG. 15 is a detailed side perspective view illustrating an arrangement structure of a light guide member and a light emitting portion, which are shown in FIGS. 13 and 14.

FIG. 13 is a detailed cross-sectional view illustrating a structure of a pen tip portion of a smart pen according to an embodiment of the present disclosure. FIG. 14 is a detailed perspective view illustrating a structure of a light guide member and a light output surface, which are shown in FIG. 13. FIG. 15 is a detailed side perspective view illustrating an arrangement structure of a light guide member and a light emitting portion, which are shown in FIGS. 13 and 14.

Referring to FIGS. 13 to 15, the light guide member 31 includes a plurality of light path forming portions 31(a), a plurality of light incident surfaces 31(e) and 31(f), and a light output surface 31(b).

The light path forming portions 31(a) may be provided to form a plurality of light paths and disposed in parallel with one another. Therefore, the plurality of light path forming portions 31(a) may be disposed in parallel in the length direction of the pen tip portion 27 to form a path of light generated from a plurality of different light emitting portions 21(a).

The light incident surfaces 31(e) and 31(f) are respectively formed on the rear surfaces of the respective light path forming portions 31(a) that form the plurality of light paths. For example, the light incident surfaces 31(e) and 31(f) of the respective light path forming portions 31(a) are positioned on the rear surface of each of the light path forming portions 31(*a*) to form a light incident path such that the light generated from the plurality of light emitting portions 21(*a*) is incident upon each of the light path forming portions 31(*a*).

The plurality of light emitting portions 21(*a*) are respectively attached to a lower surface of the fixed substrate PCL embedded in the body portion 26 or the pen tip portion 27 and thus disposed on the rear surface of the light guide member 31 in the direction of the light guide member 31. Therefore, the respective light emitting portions 21(*a*) apply infrared light to the light incident surfaces 31(*e*) and 31(*f*) of the light path forming portions 31(*a*), which are positioned to face each other. The infrared light incident upon the light incident surfaces 31(*e*) and 31(*f*) on the rear surface of the respective light path forming portions 31(*a*) is applied in the front direction through the respective light path forming portions 31(*a*).

The light output surface 31(*b*) is formed in the front direction of the light path forming portions 31(*a*) such that the light passing through the respective light path forming portions 31(*a*) is condensed. The light output surface 31(*b*) allows the light condensed from the respective light path forming portions 31(*a*) to be output in the front direction of the light path forming portions 31(*a*).

Each of the light path forming portions 31(*a*) may be diverged from the light output surface 31(*b*) and ends of the diverged rear side may be the light incident surfaces 31(*e*) and 31(*f*).

The plurality of optical protrusions 31(*d*) are formed in the light output surface 31(*b*) on the front surface of the light path forming portions 31(*a*) to diffuse the light output through the optical protrusions 31(*d*) of the light output surface 31(*b*). As described above, the plurality of optical protrusions 31(*d*) may be formed in various shapes such as a hemispherical shape, a polypyramid such as a triangular or square pyramid, a polyhedron such as trihedron or tetrahedron, irregular-shaped protrusions and the like.

Figure 16:
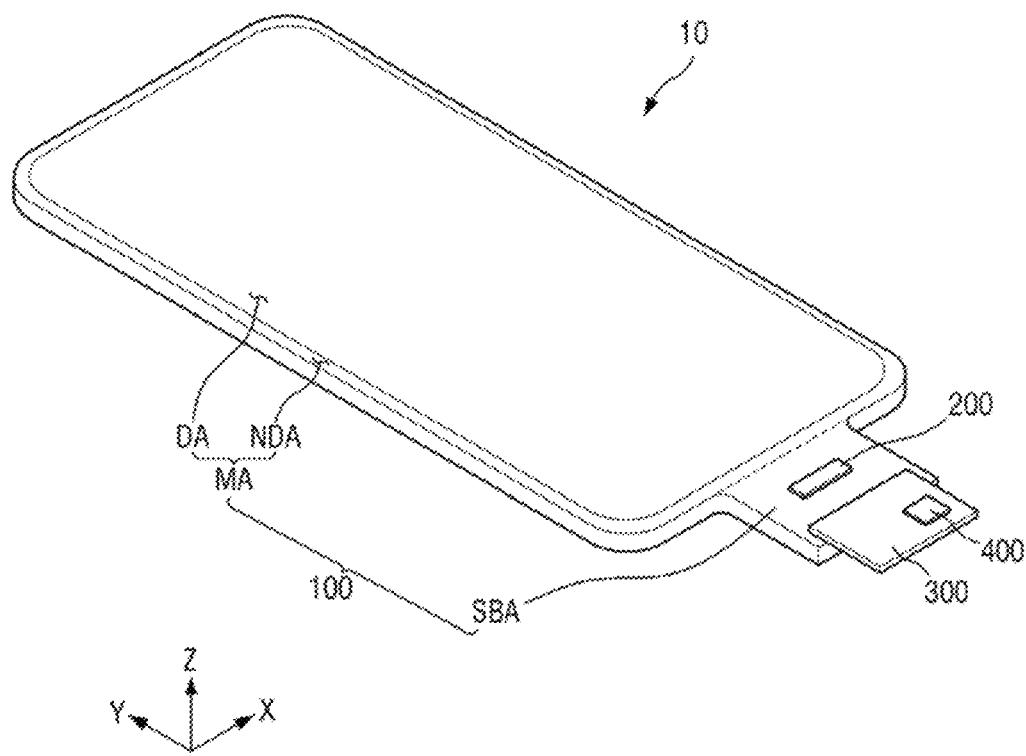
FIG. 16 is a detailed perspective view illustrating a configuration of the display device shown in FIG. 1.

FIG. 16 is a detailed perspective view illustrating a configuration of the display device shown in FIGS. 1 and 2.

Referring to FIG. 16, the display device 10 may be applied to a portable electronic device such as a mobile phone, a smart phone, a tablet personal computer (PC), a mobile communication terminal, an electronic diary, an electronic book (e-book) reader, a portable multimedia player (PMP), a navigator, and an ultra mobile PC (UMPC). For example, the display device 10 may be applied to a television, a laptop computer, a monitor, a signboard, or a display unit of an Internet of things (IoT) device. For example, the display device 10 may be applied to a wearable device such as a smart watch, a watch phone, an eyeglasses-type display and a head mounted display (HMD). For example, the display device 10 may be applied to a dashboard of a vehicle, a center fascia of a vehicle, a center information display (CID) disposed on a dashboard of a vehicle, a room mirror display that replaces a side mirror of a vehicle, or a display disposed on a rear surface of a front seat as an entertainment for a rear seat of a vehicle.

The display device 10 may be formed in a plane shape similar to a rectangular shape. For example, the display device 10 may have a plane shape similar to a rectangular shape having short sides in X-axis direction and long sides in Y-axis direction. A corner where the short side of the X-axis direction and the long side of the Y-axis direction meets may be rounded or formed at right angles to have a predetermined curvature. The plane shape of the display device 10 may be similar to other polygonal shape, a circular shape or an oval shape without necessarily being limited to the rectangular shape.

The display device 10 may include a display panel 100, a display driver 200, a circuit board 300 and a touch driver 400.

The display panel 100 may include a main area MA and a sub-area SBA.

The main area MA may include a display area DA having pixels displaying an image, and a non-display area NDA disposed proximate to the display area DA. The display area DA may emit light from a plurality of light emission areas or a plurality of opening areas. For example, the display panel 100 may include a pixel circuit including switching elements, a pixel defining layer defining a light emission area or an opening area, and a self-light emitting element.

The non-display area NDA may be an outer area of the display area DA. The non-display area NDA may be defined as an edge area of the main area MA of the display panel 100. The non-display area NDA may include a gate driver supplying gate signals to gate lines, and fan-out lines connecting the display driver 200 with the display area DA.

The sub-area SBA may be extended from one side of the main area MA. The sub-area SBA may include a flexible material capable of being subjected to bending, folding, rolling and the like, to a noticeable extent without cracking or otherwise sustaining damage. For example, when the sub-area SBA is bent, the sub-area SBA may at least partially overlap the main area MA in a thickness direction (Z-axis direction). The sub-area SBA may include a display driver 200, and a pad area connected to the circuit board 300. Optionally, the sub-area SBA may be omitted, and the display driver 200 and the pad area may be disposed in the non-display area NDA.

The display driver 200 may output signals and voltages for driving the display panel 100. The display driver 200 may supply the data voltages to data lines. The display driver 200 may supply the power voltage to the power line and supply gate control signals to the gate driver. The display driver 200 may be formed of an integrated circuit (IC) and may be packaged on the display panel 100 by a chip on glass (COG) method, a chip on plastic (COP) method or an ultrasonic bonding method. For example, the display driver 200 may be disposed in the sub-area SBA and may at least partially overlap the main area MA in the thickness direction (Z-axis direction) by bending of the sub-area SBA. For example, the display driver 200 may be packaged on the circuit board 300.

The circuit board 300 may be attached to the pad area of the display panel 100 using an anisotropic conductive film (ACF). Lead lines of the circuit board 300 may be electrically connected to the pad area of the display panel 100. The circuit board 300 may be a flexible printed circuit board, a printed circuit board, or a flexible film such as a chip on film.

The touch driver 400 may be packaged on the circuit board 300. The touch driver 400 may be connected to a touch sensing unit of the display panel 100. The touch driver 400 may supply a touch driving signal to a plurality of touch electrodes of the touch sensing unit and may sense a change in capacitance between the plurality of touch electrodes. For example, the touch driving signal may be a pulse signal having a predetermined frequency. The touch driver 400 may calculate a touch input and touch coordinates based on the change in capacitance between the plurality of touch electrodes. The touch driver 400 may be formed of an integrated circuit (IC).

Figure 17:
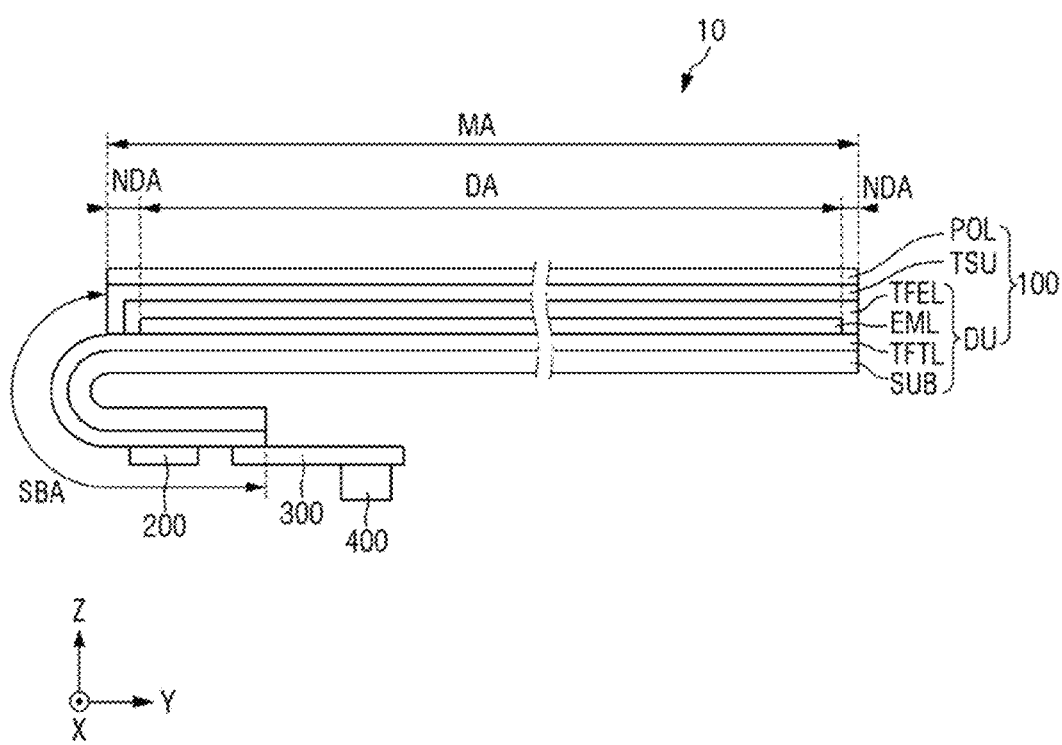
FIG. 17 is a cross-sectional view illustrating the display device shown in FIG. 1.

FIG. 17 is a cross-sectional view illustrating the display device shown in FIG. 1.

Referring to FIG. 17, the display panel 100 may include a display unit DU, a touch sensing unit TSU, and a polarizing film POL. The display unit DU may include a substrate SUB, a thin film transistor layer TFTL, a light emitting element layer EML, and an encapsulation layer TFEL.

The substrate SUB may be a base substrate or a base member. The substrate SUB may be a flexible substrate SUB capable of being subjected to bending, folding, rolling and the like. For example, the substrate SUB may include a glass material or a metal material but is not necessarily limited thereto. For example, the substrate SUB may include a polymer resin such as polyimide (PI).

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines connecting the display driver 200 with the data lines, and lead lines connecting the display driver 200 with the pad area. Each of the thin film transistors may include a semiconductor area, a source electrode, a drain electrode, and a gate electrode. For example, when the gate driver is formed on one side of the non-display area NDA of the display panel 100, the gate driver may include thin film transistors.

The thin film transistor layer TFTL may be disposed in the display area DA, the non-display area NDA, and the sub-area SBA. The thin film transistors of each of pixels of the thin film transistor layer TFTL, the gate lines, the data lines and the power lines may be disposed in the display area DA. The gate control lines and fan out lines of the thin film transistor layer TFTL may be disposed in the non-display area NDA. The lead lines of the thin film transistor layer TFTL may be disposed in the sub-area SBA.

The light emitting element layer EML may be disposed on the thin film transistor layer TFTL. The light emitting element layer EML may include a plurality of light emitting elements that include a first electrode, a light emitting layer and a second electrode, which are sequentially stacked to emit light, and a pixel defining layer that defines pixels. The plurality of light emitting elements of the light emitting element layer EML may be disposed in the display area DA.

For example, the light emitting layer may be an organic light emitting layer that includes an organic material. The light emitting layer may include a hole transporting layer, an organic light emitting layer, and an electron transporting layer. When the first electrode receives a predetermined voltage through the thin film transistor of the thin film transistor layer TFTL and the second electrode receives a cathode voltage, holes and electrons may move to the organic light emitting layer through the hole transporting layer and the electron transporting layer, respectively, and may be coupled to each other in the organic light emitting layer to emit light. For example, the first electrode may be an anode electrode and the second electrode may be a cathode electrode, but they are not necessarily limited thereto.

For example, the plurality of light emitting elements may include a quantum dot light emitting diode including a quantum dot light emitting layer, or an inorganic light emitting diode including an inorganic semiconductor.

The encapsulation layer TFEL may cover an upper surface and a side of the light emitting element layer EML and protect the light emitting element layer EML. The encapsulation layer TFEL may include at least one inorganic layer and at least one organic layer to encapsulate the light emitting element layer EML.

The touch sensing unit TSU may be disposed on the encapsulation layer TFEL. The touch sensing unit TSU may include a plurality of touch electrodes for sensing a user's touch in a capacitance manner and touch lines for connecting the plurality of touch electrodes with the touch driver 400. For example, the touch sensing unit TSU may sense a user's touch in a mutual capacitance manner or a self-capacitance manner.

For example, the touch sensing unit TSU may be disposed on a separate substrate on the display unit DU. In this case, the substrate for supporting the touch sensing unit TSU may be a base member encapsulating the display unit DU.

A plurality of touch electrodes of the touch sensing unit TSU may be disposed in a touch sensor area at least partially overlapped with the display area DA. The touch lines of the touch sensing unit TSU may be disposed in a touch peripheral area at least partially overlapped with the non-display area NDA.

The polarizing film POL may be disposed on the touch sensing unit TSU. The polarizing film POL may be attached to the touch sensing unit TSU by an optically clear adhesive (OCA) film or an optically clear resin (OCR). For example, the polarizing film POL may include a linear polarizing plate and a phase delay film such as a $\lambda/4$ plate (quarter-wave plate). The phase delay film and the linear polarizing plate may sequentially be stacked on the touch sensing unit TSU.

The sub-area SBA of the display panel 100 may be extended from one side of the main area MA. The sub-area SBA may include a flexible material capable of being subjected to bending, folding, rolling and the like. For example, when the sub-area SBA is bent, the sub-area SBA may at least partially overlap the main area MA in the thickness direction (Z-axis direction). The sub-area SBA may include a display driver 200 and a pad area connected to the circuit board 300.

Figure 18:
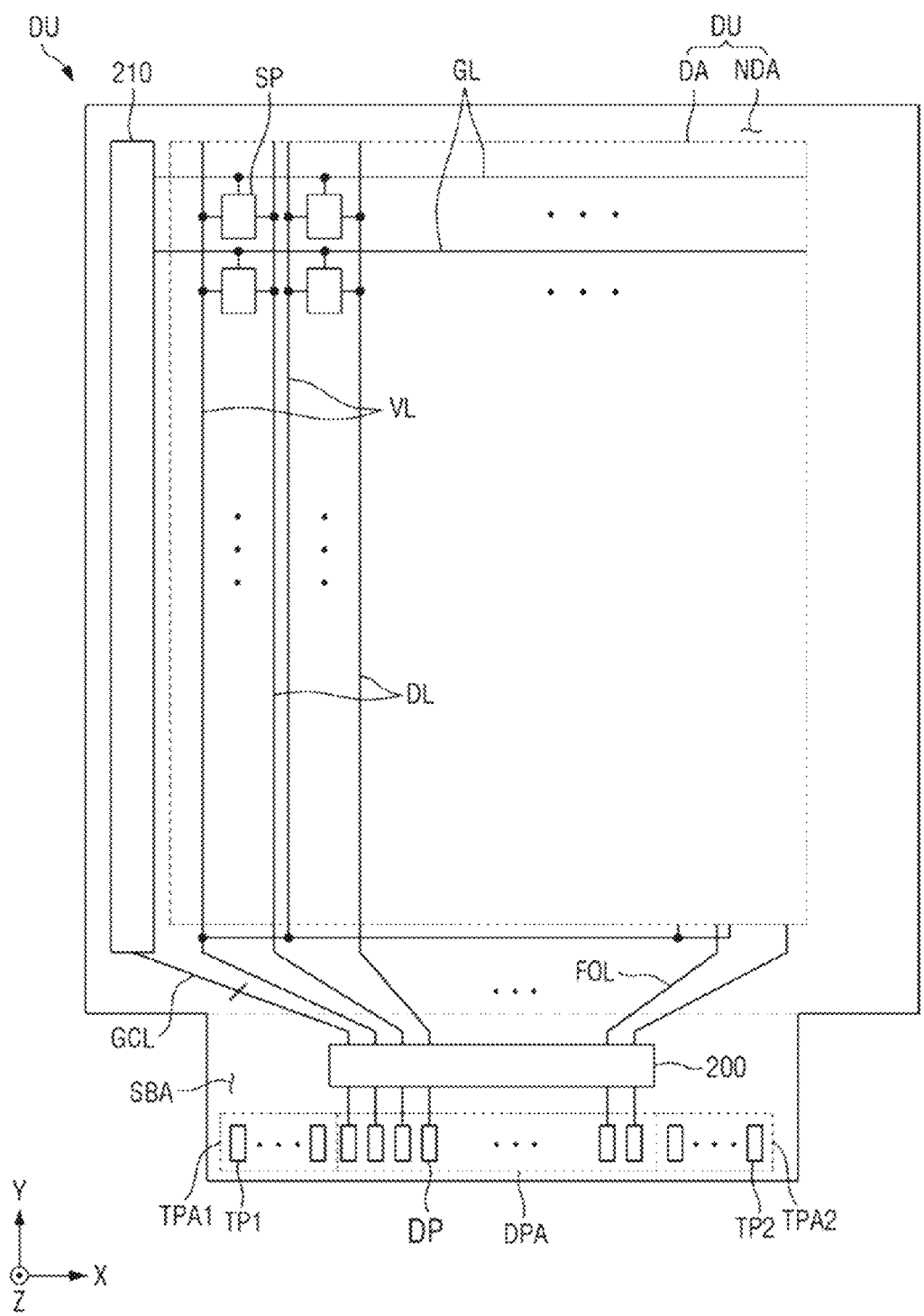
FIG. 18 is a plan view illustrating a display unit of a display device according to an embodiment of the present disclosure.

FIG. 18 is a plan view illustrating a display unit of a display device according to an embodiment of the present disclosure.

Referring to FIG. 18, the display unit DU may include a display area DA and a non-display area NDA.

The display area DA is an area for displaying an image and may be defined as a central area of the display panel 100. The display area DA may include a plurality of pixels SP, a plurality of gate lines GL, a plurality of data lines DL and a plurality of power lines VL. Each of the plurality of pixels SP may be defined as a minimum unit for outputting light.

The plurality of gate lines GL may supply the gate signals received from the gate driver 210 to the plurality of pixels SP. The plurality of gate lines GL may be extended in the X-axis direction and may be spaced apart from each other in the Y-axis direction crossing the X-axis direction.

The plurality of data lines DL may supply the data voltages received from the display driver 200 to the plurality of pixels SP. The plurality of data lines DL may be extended in the Y-axis direction and may be spaced apart from each other in the X-axis direction.

The plurality of power lines VL may supply the power voltage received from the display driver 200 to the plurality of pixels SP. The power voltage may be at least one of a driving voltage, an initialization voltage or a reference voltage. The plurality of power lines VL may be extended in the Y-axis direction and may be spaced apart from each other in the X-axis direction.

The non-display area NDA may at least partially surround the display area DA. The non-display area NDA may include a gate driver 210, fan-out lines FOL and gate control lines GCL. The gate driver 210 may generate a plurality of gate signals based on the gate control signals and may sequentially supply the plurality of gate signals to the plurality of gate lines GL in accordance with a predetermined order.

The fan-out lines FOL may be extended from the display driver 200 to the display area DA. The fan-out lines FOL may supply the data voltages received from the display driver 200 to the plurality of data lines DL.

The gate control line GCL may be extended from the display driver 200 to the gate driver 210. The gate control line GCL may supply the gate control signals received from the display driver 200 to the gate driver 210.

The sub-area SBA may include a display driver 200, a display pad area DPA, and first and second touch pad areas TPA1 and TPA2.

The display driver 200 may output signals and voltages for driving the display panel 100 to the fan-out lines FOL. The display driver 200 may supply the data voltages to the data lines DL through the fan-out lines FOL. The data voltages may be supplied to the plurality of pixels SP, and may determine luminance of the plurality of pixels SP. The display driver 200 may supply the gate control signals to the gate driver 210 through the gate control line GCL.

The display pad area DPA, the first touch pad area TPA1 and the second touch pad area TPA2 may be disposed at an edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The display pad area DPA may include a plurality of display pad areas DP. The plurality of display pad areas DP may be connected to the main processor 500 through the circuit board 300. The plurality of display pad areas DP may be connected to the circuit board 300 to receive digital video data and may supply the digital video data to the display driver 200.

Figure 19:
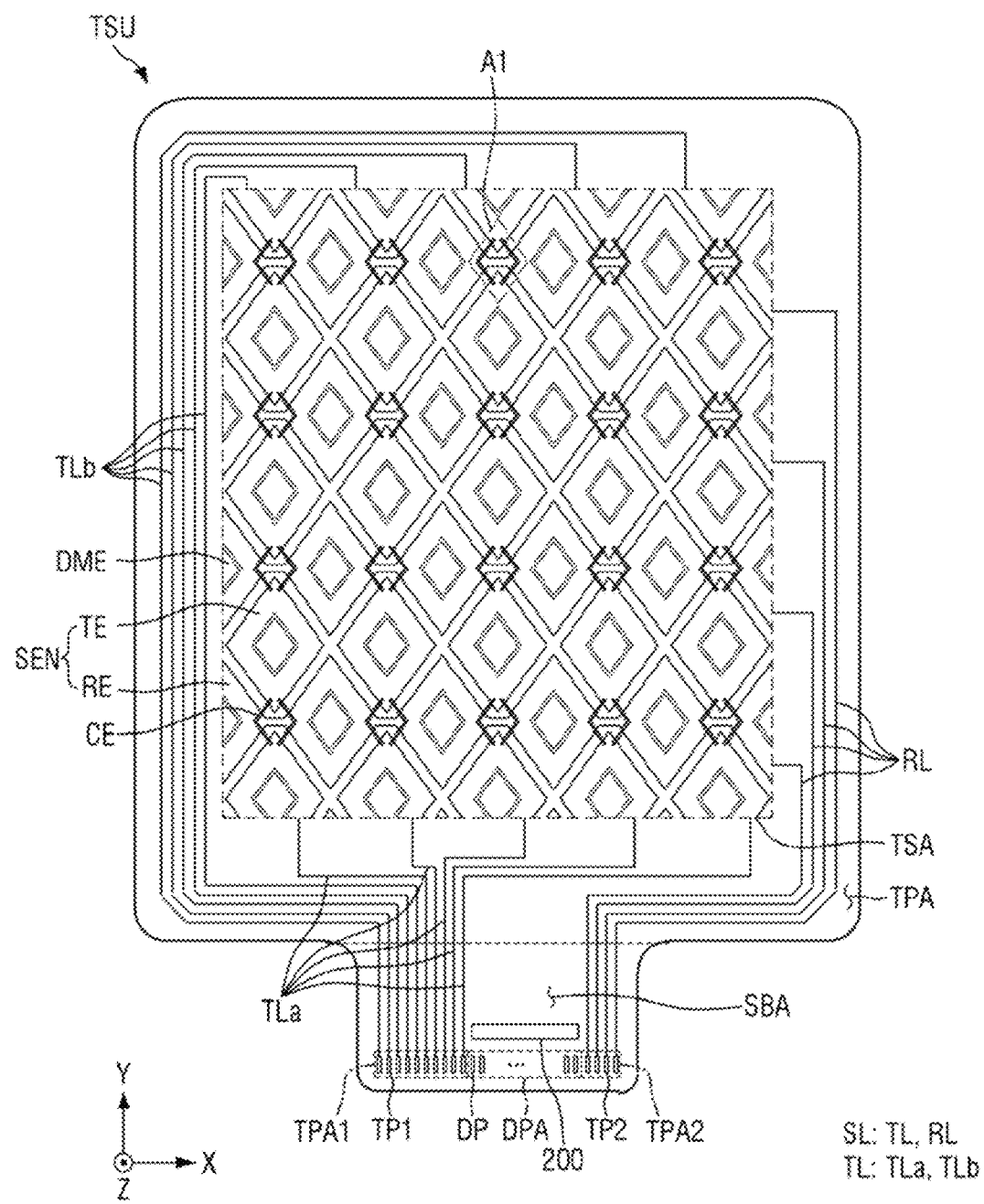
FIG. 19 is a plan view illustrating a touch sensing unit of a display device according to an embodiment of the present disclosure.

FIG. 19 is a plan view illustrating a touch sensing unit of a display device according to an embodiment of the present disclosure.

Referring to FIG. 19, the touch sensing unit TSU may include a touch sensor area TSA for sensing a user's touch, and a touch peripheral area TPA disposed proximate to the touch sensor area TSA. The touch sensor area TSA may at least partially overlap the display area DA of the display unit DU, and the touch peripheral area TPA may at least partially overlap the non-display area NDA of the display unit DU.

The touch sensor area TSA may include a plurality of touch electrodes SEN and a plurality of dummy electrodes DME. The plurality of touch electrodes SEN may form mutual capacitance or magnetic capacitance to sense an object or a touch of a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a bridge electrode CE.

The plurality of driving electrodes TE may be connected to a first touch pad TP1 through a driving line TL. The driving line TL may include a lower driving line TLa and an upper driving line TLb. For example, some driving electrodes TE disposed below the touch sensor area TSA may be connected to the first touch pad TP1 through the lower driving line TLa, and the driving electrodes TE disposed above the touch sensor area TSA may be connected to the first touch pad TP1 through the upper driving line TLb. The lower driving line TLa may be extended from a lower side of the touch peripheral area TPA to the first touch pad TP1. The upper driving line TLb may be extended to the first touch pad TP1 via upper, left and lower sides of the touch peripheral area TPA. The first touch pad TP1 may be connected to the touch driver 400 through the circuit board 300.

The bridge electrode CE may be bent at least once. For example, the bridge electrode CE may have a chevron or bent shape ("<" or ">"), but its plane shape is not necessarily limited thereto. The driving electrodes TE adjacent to each other in the Y-axis direction may be connected by a plurality of bridge electrodes CE, and even though any one of the bridge electrodes CE is disconnected, the driving electrodes TE may stably be connected through the other bridge electrodes CE. The driving electrodes TE adjacent to each other may be connected by two bridge electrodes CE, but the number of the bridge electrodes CE is not necessarily limited thereto.

The bridge electrode CE may be disposed in a layer different from that of the plurality of driving electrodes TE and the plurality of sensing electrodes RE. The sensing electrodes RE adjacent to each other in the X-axis direction may be electrically connected through a connection portion disposed in the same layer as the plurality of driving electrodes TE or the plurality of sensing electrodes RE. The driving electrodes TE adjacent to each other in the Y-axis direction may be electrically connected through the bridge electrode CE disposed in a layer that is different from that of the plurality of driving electrodes TE or the plurality of sensing electrodes RE. Therefore, even though the bridge electrode CE at least partially overlaps the plurality of sensing electrodes RE in the Z-axis direction, the plurality of driving electrodes TE may be insulated from the plurality of sensing electrodes RE. Mutual capacitance may be formed between the driving electrode TE and the sensing electrode RE.

The plurality of sensing electrodes RE may be extended in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may electrically connected with each other through the connection portion.

The plurality of sensing electrodes RE may be connected to a second touch pad TP2 through a sensing line RL. For example, some sensing electrodes RE disposed on a right side of the touch sensor area TSA may be connected to the second touch pad TP2 through the sensing line RL. The sensing line RL may be extended to the second touch pad TP2 via right and lower sides of the touch peripheral area TPA. The second touch pad TP2 may be connected to the touch driver 400 through the circuit board 300.

Each of the plurality of dummy electrodes DME may be at least partially surrounded by the driving electrode TE or the sensing electrode RE. Each of the plurality of dummy electrodes DME may be spaced apart from the driving electrode TE or the sensing electrode RE and then insulated therefrom. Therefore, the dummy electrode DME may electrically be floated.

The display pad area DPA, the first touch pad area TPA1 and the second touch pad area TPA2 may be disposed at the edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The first touch pad area TPA1 may be disposed on one side of the display pad area DPA and may include a plurality of first touch pads TP1. The plurality of first touch pads TP1 may be electrically connected to the touch driver 400 disposed on the circuit board 300. The plurality of first touch pads TP1 may supply the touch driving signal to the plurality of driving electrodes TE through the plurality of driving lines TL.

The second touch pad area TPA2 may be disposed on the other side of the display pad area DPA and may include a plurality of second touch pads TP2. The plurality of second touch pads TP2 may be electrically connected to the touch driver 400 disposed on the circuit board 300. The touch driver 400 may receive a touch sensing signal through the plurality of sensing lines RL connected to the plurality of second touch pads TP2, and may sense a mutual capacitance change between the driving electrode TE and the sensing electrode RE.

For example, the touch driver 400 may supply the touch driving signal to each of the plurality of driving electrodes TE and the plurality of sensing electrodes RE, and may receive the touch sensing signal from each of the plurality of driving electrodes TE and the plurality of sensing electrodes RE. The touch driver 400 may sense a charge change of each of the plurality of driving electrodes TE and the plurality of sensing electrodes RE based on the touch sensing signal.

Figure 20:
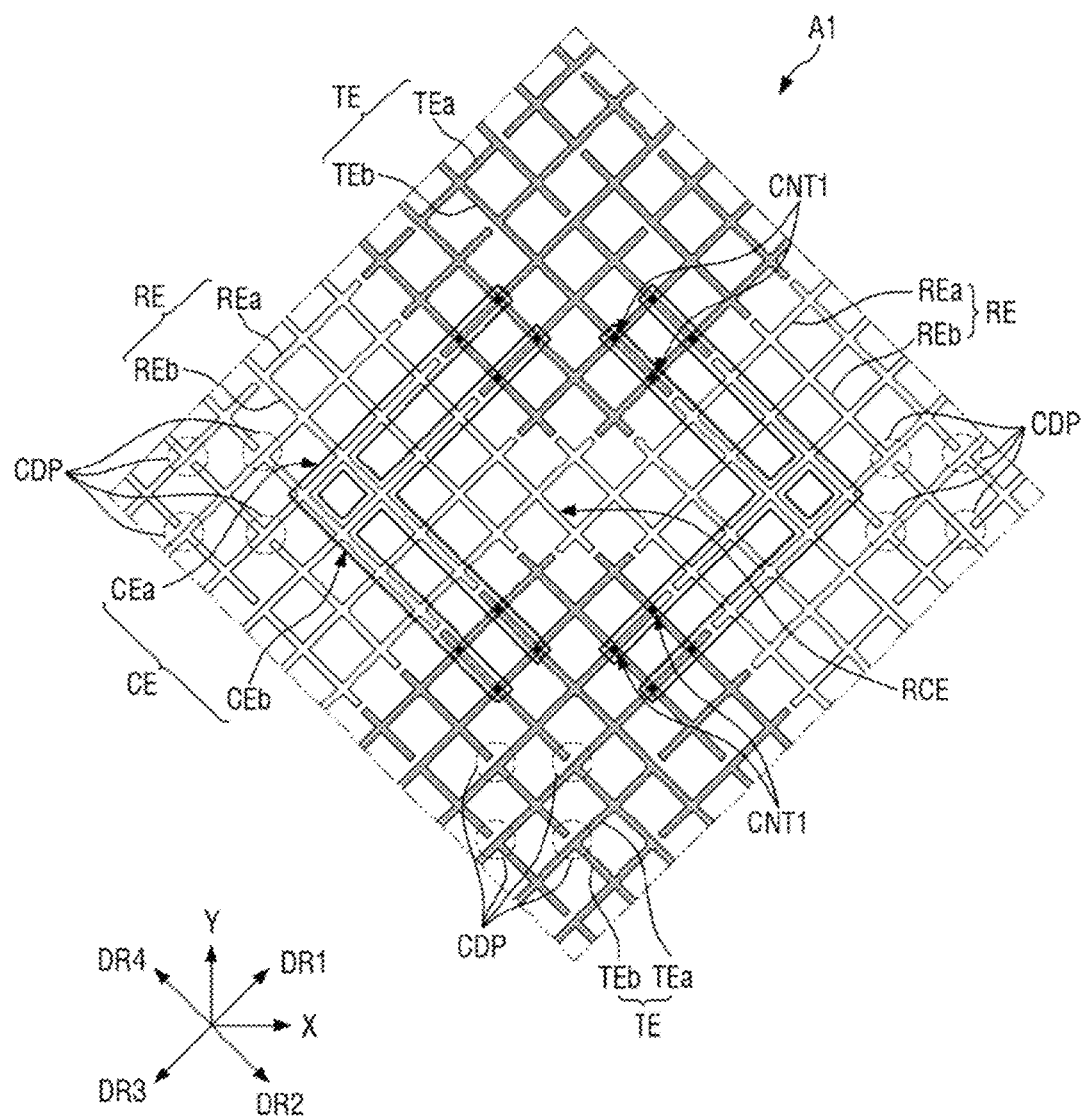
FIG. 20 is an enlarged view illustrating an area A1 shown in FIG. 19.
Figure 21:
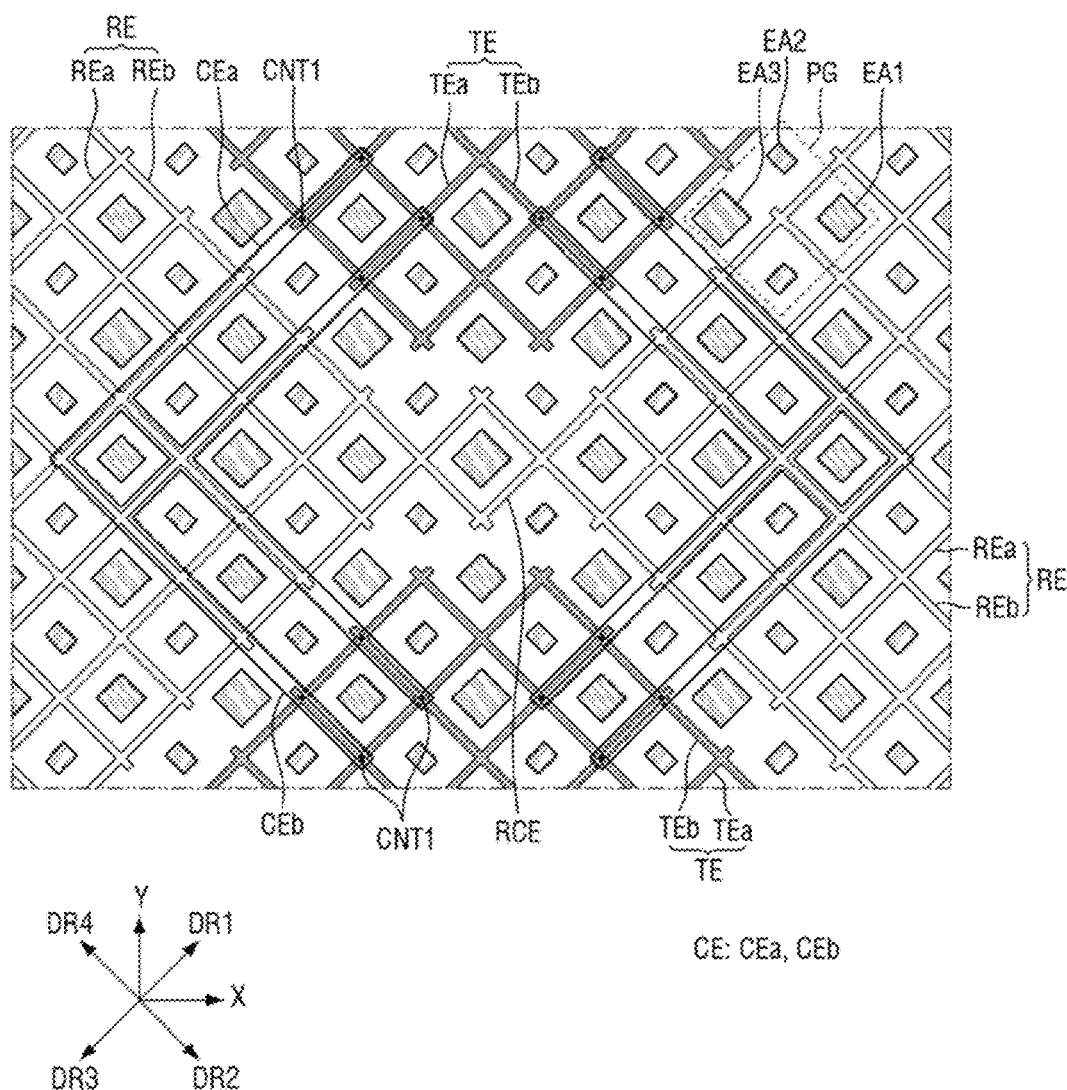
FIG. 21 is a detailed enlarged view illustrating a portion of an area A1 shown in FIG. 20.

FIG. 20 is an enlarged view illustrating an area A1 shown in FIG. 19, and FIG. 21 is a detailed enlarged view illustrating a portion of an area A1 shown in FIG. 20.

Referring to FIGS. 20 and 21, the plurality of driving electrodes TE, the plurality of sensing electrodes RE and the plurality of dummy electrodes DME may be disposed in the same layer and may be spaced apart from one another.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the bridge electrode CE.

The plurality of sensing electrodes RE may be extended in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through a connection portion RCE. For example, the connection portion RCE of the sensing electrodes RE may be disposed within a shortest distance of the driving electrodes TE adjacent to each other.

The plurality of bridge electrodes CE may be disposed in a layer different from that of the driving electrode TE and the sensing electrode RE. The bridge electrode CE may include a first portion CEa and a second portion CEb. For example, the first portion CEa of the bridge electrode CE may be connected to the driving electrode TE disposed on one side through a first contact hole CNT1 and extended in a third direction DR3. The second portion CEb of the bridge electrode CE may be extended in a second direction DR2 by being bent from the first portion CEa in an area at least partially overlapped with the sensing electrode RE and may be connected to the driving electrode TE disposed on the other side through the first contact hole CNT1. Hereinafter, a first direction DR1 may be a direction between the X-axis direction and the Y-axis direction, the second direction DR2 may be a direction between an opposite direction of the Y-axis and the X-axis direction, the third direction DR3 may be an opposite direction of the first direction DR1, and a fourth direction DR4 may be an opposite direction of the second direction DR2. Therefore, each of the plurality of bridge electrodes CE may connect the driving electrodes TE adjacent to each other in the Y-axis direction with each other.

For example, the plurality of driving electrodes TE, the plurality of sensing electrodes RE and the plurality of dummy electrodes DME may be formed in a planar mesh structure or a netted structure. The plurality of driving electrodes TE, the plurality of sensing electrodes RE and the plurality of dummy electrodes DME may at least partially surround each of first to third light emission areas EA1, EA2 and EA3 of a pixel group PG on a plane. Therefore, the plurality of driving electrodes TE, the plurality of sensing electrodes RE and the plurality of dummy electrodes DME might not overlap the first to third light emission areas EA1, EA2 and EA3. The plurality of bridge electrodes CE might not overlap the first to third light emission areas EA1, EA2 and EA3, either. Therefore, the display device 10 may prevent luminance of light emitted from the first to third light emission areas EA1, EA2 and EA3 from being reduced by the touch sensing unit TSU.

Each of the plurality of driving electrodes TE may include a first portion TEa that is extended in the first direction DR1 and a second portion TEb that is extended in the second direction DR2. Each of the plurality of sensing electrodes RE may include a first portion REa that is extended in the first direction DR1 and a second portion REb that is extended in the second direction DR2.

At least a portion of the plurality of touch electrodes SEN may include a code pattern portion CDP. At least a portion of the driving electrodes TE or at least a portion of the plurality of sensing electrodes RE may include a code pattern portion CDP. The code pattern portion CDP may include a plurality of code patterns that are cut/inscribed/printed in accordance with a specific reference to have position information. The plurality of code patterns may correspond to a value of a preset data code. For example, the plurality of code patterns may be provided by cutting one of a plurality of stems extended at an intersection point of at least a portion of the touch electrodes SEN but is not necessarily limited thereto. A plurality of stems of at least a portion of the touch electrodes SEN may be extended from the intersection point in the first to fourth directions DR1, DR2, DR3 and DR4, and a stem extended in one of the first to fourth directions DR1, DR2, DR3 and DR4 may be cut. The direction in which the stem is cut may correspond to the value of the preset data code constituting the position information.

The plurality of pixels may include first to third subpixels, and each of the first to third subpixels may include the first to third light emission areas EA1, EA2 and EA3. For example, the first light emission area EA1 may emit light of a first color or red light, the second light emission area EA2 may emit light of a second color or a green light, and the third light emission area EA3 may emit light of a third color or blue light, but these light emission areas are not necessarily limited thereto.

One pixel group PG may include one first light emission area EA1, two second light emission areas EA2 and one third light emission area EA3 to express a white gray scale. Therefore, the white gray scale may be expressed by combination of light emitted from one first light emission area EA1, light emitted from two second light emission areas EA2 and light emitted from one third light emission area EA3.

Figure 22:
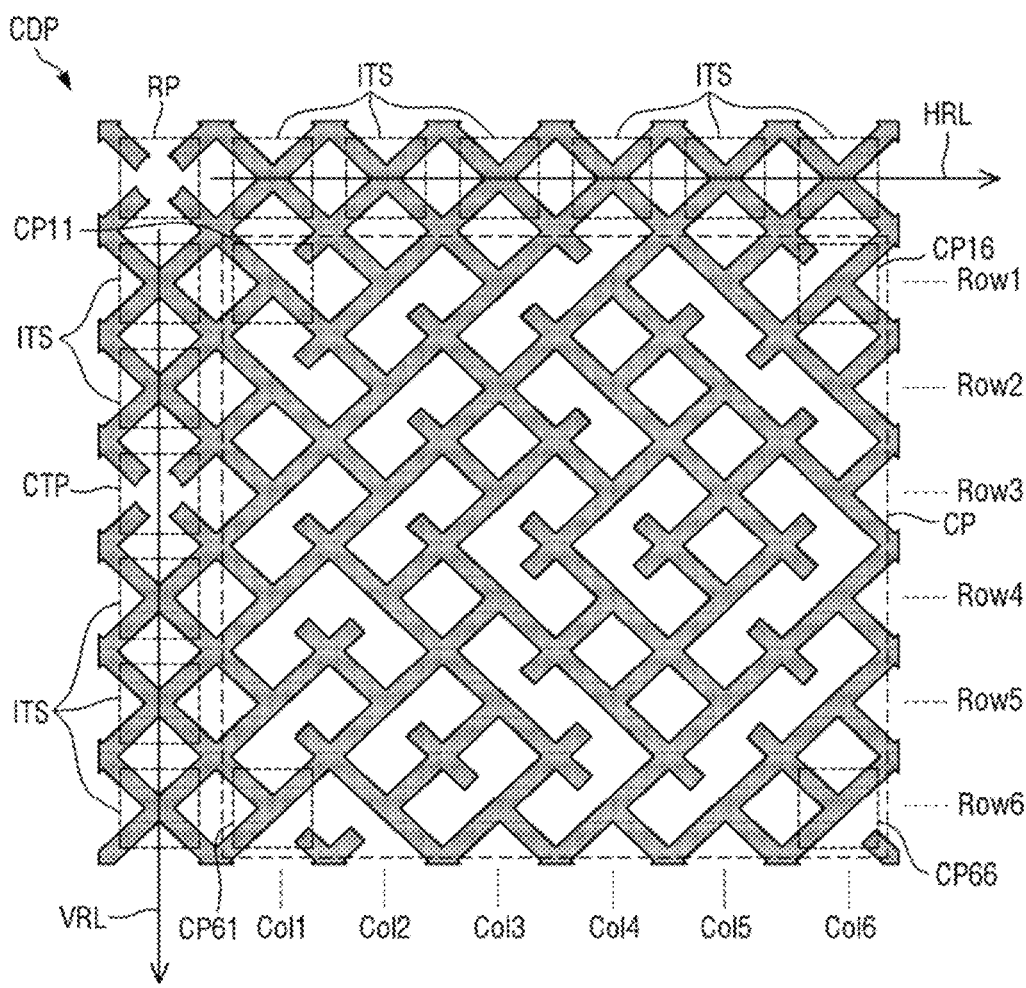
FIG. 22 is a view illustrating an example of a code pattern portion in a display device according to an embodiment of the present disclosure.
Figure 22:
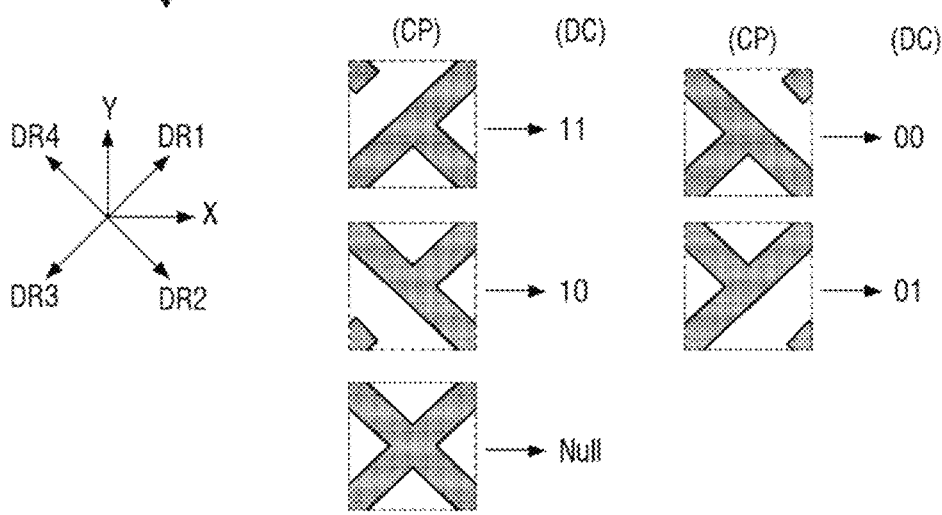

FIG. 22 is a view illustrating an example of a code pattern portion in a display device according to an embodiment of the present disclosure. FIG. 23 is a view illustrating a data code corresponding to the code pattern portion of FIG. 22.

Referring to FIGS. 22 and 23, a plurality of touch electrodes SEN may be formed in a planar mesh structure or a netted structure. Sides of a minimum unit of the plurality of touch electrodes SEN may be extended in the first direction DR1 and the second direction DR2 to cross each other. At least a portion of the plurality of touch electrodes SEN may include a code pattern portion CDP. At least a portion of the plurality of driving electrodes TE or at least a portion of the plurality of sensing electrodes RE may include a code pattern portion CDP.

The code pattern portion CDP may include a reference point RP, a first reference line HRL, a second reference line VRL, and a plurality of code patterns CP.

The reference point RP may be an identification reference of the code pattern portion CDP. For example, the reference point RP may correspond to an area where an intersection point of at least a portion of the touch electrodes SEN is cut. For example, the reference point RP may be disposed on a left upper end of the code pattern portion CDP but is not necessarily limited thereto.

The first reference line HRL may be extended from the reference point RP in the X-axis direction. The first reference line HRL may be defined by connecting a plurality of intersection points ITS disposed in the X-axis direction of the reference point RP. For example, when the first reference line HRL is defined by connecting six intersection points ITS, the plurality of code patterns CP may be arranged along six columns including six intersection points.

The second reference line VRL may be extended from the reference point RP in the Y-axis direction. The second reference line VRL may be defined by connecting the plurality of intersection points ITS disposed in the Y-axis direction of the reference point RP with a cut-out portion CTP disposed between the plurality of intersection points ITS. For example, the second reference line VRL may be defined by connecting two intersection points ITS, one cut-out portion CTP and three intersection points ITS, and the plurality of code patterns CP may be arranged along six rows including five intersection points and one cut-out portion CTP.

The plurality of code patterns CP may be disposed in an area defined by the first reference line HRL and the second reference line VRL. A slope or rotational angle of the plurality of code patterns CP with respect to a camera may be sensed by the first reference line HRL and the second reference line VRL. For example, when the first reference line HRL is defined by connecting six intersection points ITS and the second reference line VRL is defined by connecting two intersection points ITS, one cut-out portion CTP and three intersection points ITS, the plurality of code patterns CP may be arranged in a 6×6 matrix (6 by 6 matrix).

The plurality of code patterns CP may be cut/inscribed/printed in accordance with a specific reference to have position information. The plurality of code patterns CP may correspond to a value of a preset data code DC. For example, the plurality of code patterns CP may be provided by cutting one of a plurality of stems extended from the intersection point of at least a portion of the touch electrodes SEN. The plurality of stems of at least a portion of the touch electrodes SEN may be extended from the intersection point to the first to fourth directions DR1, DR2, DR3 and DR4, and a stem extended in one of the first to fourth directions DR1, DR2, DR3 and DR4 may be cut. The direction in which the stem is cut may correspond to a value of the preset data code DC that constitutes position information. For example, a code pattern CP disposed in an (m)th row (hereinafter, m is a positive integer) and an (n)th column (hereinafter, n is a positive integer) may correspond to a data code DC disposed in the (m)th row and the (n)th column.

For example, the code pattern CP in which the stem of the first direction DR1 is cut may correspond to a data code DC of [00]. The code pattern CP in which the stem of the second direction DR2 is cut may correspond to a data code DC of [01]. The code pattern CP in which the stem of the third direction DR3 is cut may correspond to a data code DC of [10]. The code pattern CP in which the stem of the fourth direction DR4 is cut may correspond to a data code DC of [11].

In an eleventh code pattern CP11 disposed in a first row Row1 and a first column Co11, its stem in the first direction DR1 may be cut, and an eleventh data code DC11 may have a value of [00]. In a 61st code pattern CP61 disposed in a sixth row Row6 and the first column Co11, its stem in the second direction DR2 may be cut, and a 61st data code DC61 may have a value of [01]. In a 62rd code pattern C62 disposed in the sixth row Row6 and a second column Co12, its item in the third direction DR3 may be cut, and a 62rd data code DC62 may have a value of [10]. In a sixteenth code pattern CP16 disposed in the first row Row1 and a sixth column Co16, its stem in the fourth direction DR4 may be cut, and a sixteenth data code DC16 may have a value of [11].

The plurality of code patterns CP may further include a conducting pattern in which a plurality of stems extended from the intersection point are not cut. The conducting pattern might not have a value of the data code DC (Null). The conducting pattern may be disposed at a necessary position so that the plurality of touch electrodes SEN may normally perform a touch operation. The plurality of code patterns CP may include a conducting pattern, thereby preventing the plurality of touch electrodes SEN from being degraded. For example, a 32rd code pattern CP32 disposed in a third row Row3 and a second column Co12 may correspond to the conducting pattern, and a 32rd data code DC32 might not have a value (Null).

The display device 10 may include a plurality of code patterns CP provided in at least a portion of the plurality of touch electrodes SEN, thereby receiving a touch input of a touch input device such as the smart pen 20. The plurality of code patterns CP may be cut in accordance with a specific reference to have position information and may correspond to preset data codes DC in one-to-one correspondence. Therefore, the display device 10 may receive coordinate data generated without complex calculation and correction by using the data codes DC, thereby reducing costs, reducing power consumption and simplifying a driving process. In addition, the display device 10 may include a plurality of code patterns CP provided in at least a portion of the touch electrodes SEN, thereby being applied to all electronic devices having a touch function without restriction in size.

Figure 24:
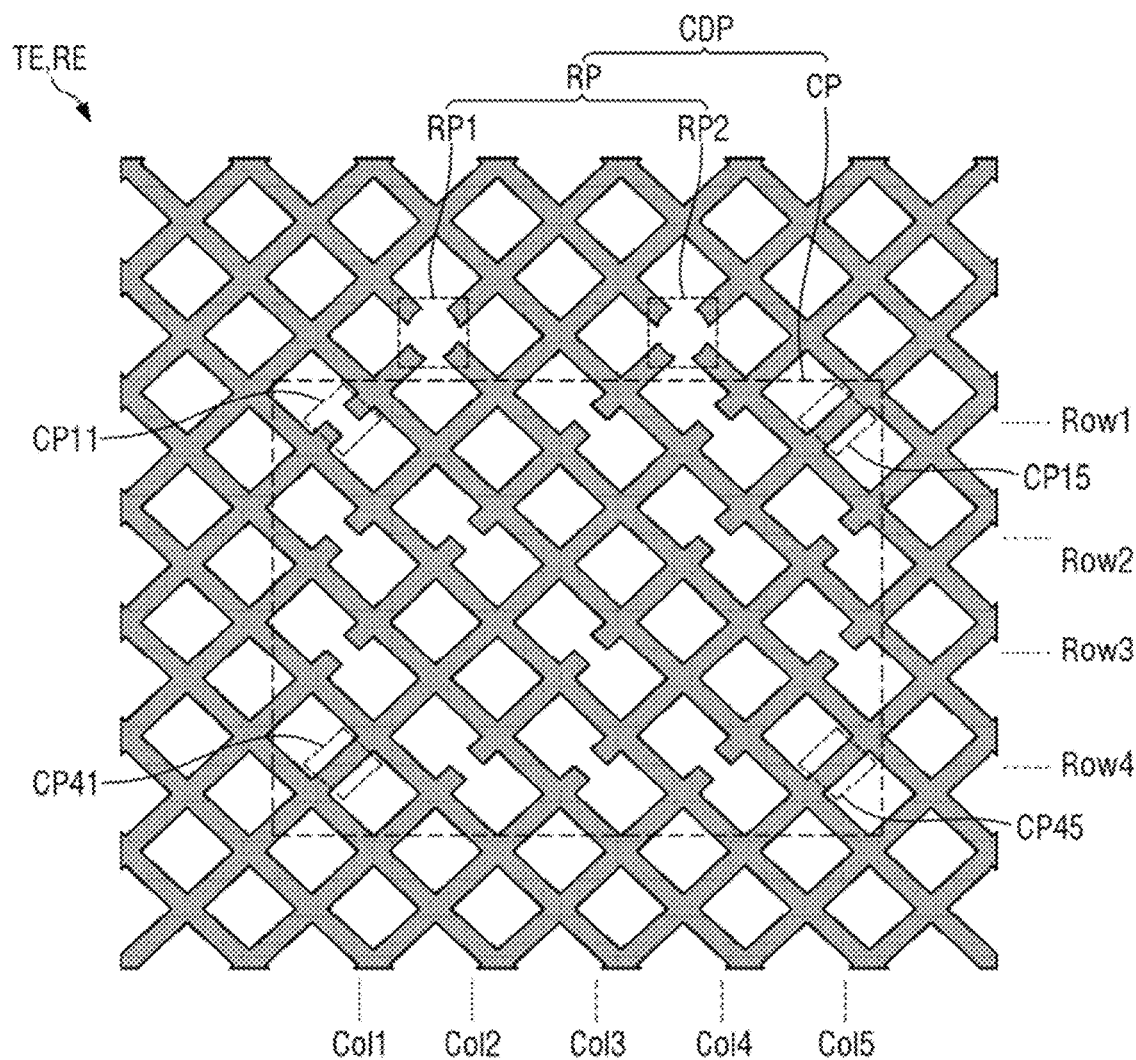
FIG. 24 is a view illustrating an example of a code pattern portion in a display device according to an embodiment of the present disclosure.

FIG. 24 is a view illustrating an example of a code pattern portion in a display device according to an embodiment of the present disclosure. FIG. 25 is a view illustrating a data code corresponding to the code pattern portion of FIG. 24.

Referring to FIGS. 24 and 25, a plurality of touch electrodes SEN may be formed in a planar mesh structure or a netted structure. Sides of a minimum unit of the plurality of touch electrodes SEN may be extended in the first direction DR1 and the second direction DR2 to cross each other. At least a portion of the plurality of touch electrodes SEN may include a code pattern portion CDP. At least a portion of the plurality of driving electrodes TE or at least a portion of the plurality of sensing electrodes RE may include a code pattern portion CDP.

The code pattern portion CDP may include a reference point RP and a plurality of code patterns CP.

The reference point RP may be an identification reference of the code pattern portion CDP. For example, the reference point RP may correspond to an area where an intersection point of at least a portion of the touch electrodes SEN is cut. The reference point RP may include first and second reference points RP1 and RP2. For example, the first and second reference points RP1 and RP2 may be spaced apart from each other above the plurality of code patterns CP but are not necessarily limited thereto.

The plurality of code patterns CP may be disposed in a predetermined area based on the first and second reference points RP1 and RP2. A slope or rotational angle of the plurality of code patterns CP with respect to a camera may be sensed by the first and second reference points RP1 and RP2. For example, when the first and second reference points RP1 and RP2 are spaced apart from each other in a specific row, the plurality of code patterns CP may be arranged in an m×n matrix (m by n matrix) from next row of the row in which the first and second reference points RP1 and RP2 are disposed.

The plurality of code patterns CP may be cut in accordance with a specific reference to have position information. The plurality of code patterns CP may correspond to a value of a preset data code DC. For example, the plurality of code patterns CP may include an uncut portion and a cut portion among a plurality of sides constituting a mesh shape. In this case, a central portion of the side may be cut, but the cutting position is not necessarily limited thereto. Cutting of the plurality of sides may correspond to the value of the preset data code DC constituting the position information. For example, the code pattern CP disposed in the (m)th row and the (n)th column may correspond to the data code DC disposed in the (m)th row and the (n)th column. For example, the code pattern CP including an uncut side may correspond to a data code DC of [0]. The code pattern CP including a cut side may correspond to a data code DC of [1].

The eleventh code pattern CP11 disposed in the first row Row1 and the first column Co11 may include a cut side, and the eleventh data code DC11 may have a value of [1]. A 45th code pattern CP45 disposed in a fourth row Row4 and a fifth column Co15 may include an uncut side, and a 45th data code DC45 may have a value of [0].

The data code DC arranged in some rows may constitute first data Data1 of coordinate data, and the data code DC arranged in other rows may constitute second data Data2 of the coordinate data. For example, the first data Data1 may correspond to X-axis coordinates of a touch position, and the second data Data2 may correspond to Y-axis coordinates of the touch position, but examples of the first and second data Data1 and Data2 are not necessarily limited thereto.

For example, the data code DC arranged in the first row Row1 and a second row Row2 may constitute the first data Data1 of the coordinate data, and the data code DC arranged in the third row Row3 and the fourth row Row4 may constitute the second data Data2 of the coordinate data. Therefore, the plurality of code patterns CP may be converted into corresponding data codes DC, and the coordinate data may quickly be generated based on the data codes DC without complex calculation and correction.

The display device 10 may include a plurality of code patterns CP provided in at least a portion of the plurality of touch electrodes SEN, thereby receiving a touch input of a touch input device such as the smart pen 20. The plurality of code patterns CP may be cut in accordance with a specific reference to have position information and may correspond to preset data codes DC in one-to-one correspondence. Therefore, the display device 10 may receive coordinate data generated without complex calculation and correction by using the data codes DC, thereby reducing costs, reducing power consumption and simplifying a driving process. In addition, the display device 10 may include a plurality of code patterns CP provided in at least a portion of the touch electrodes SEN, thereby being applied to all electronic devices having a touch function without restriction in size.

Figure 26:
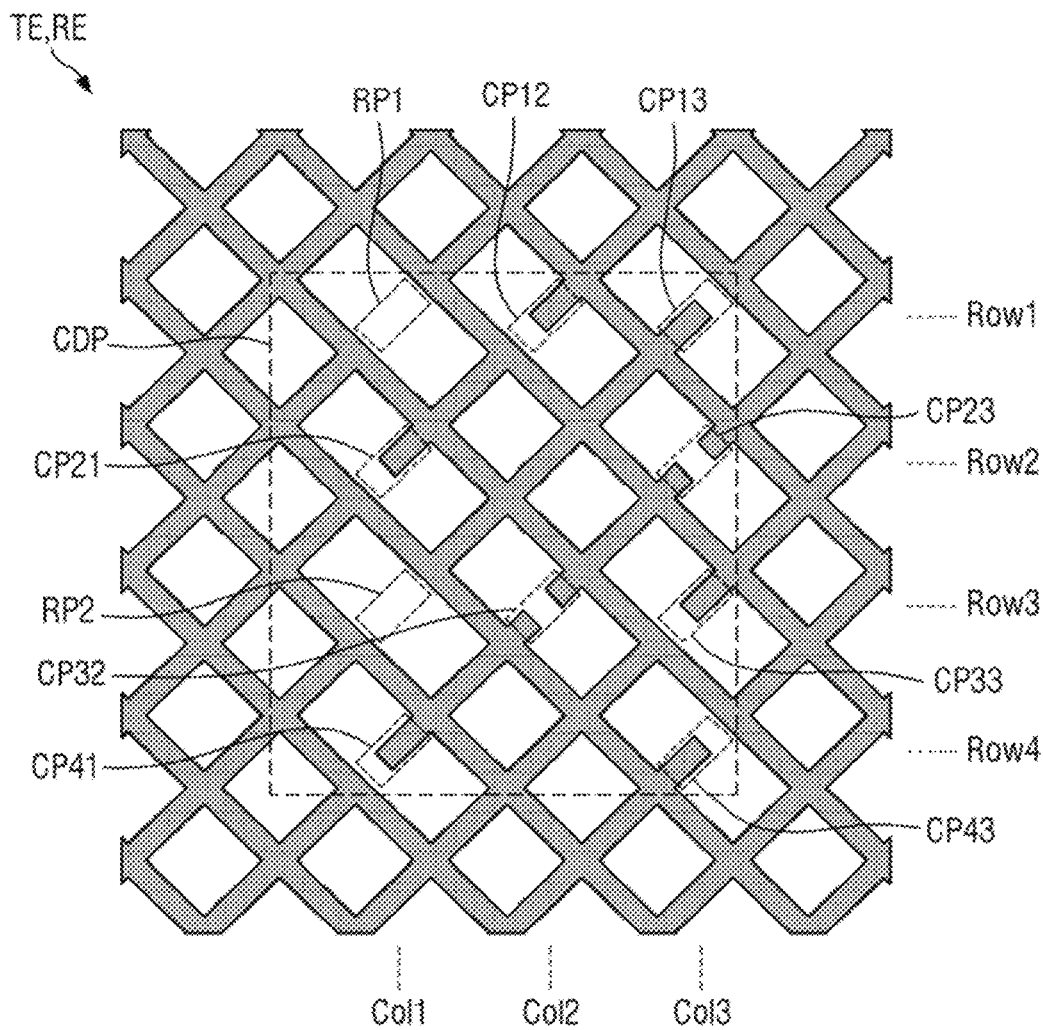
FIG. 26 is a view illustrating an example of a code pattern portion in a display device according to an embodiment of the present disclosure.
Figure 26:
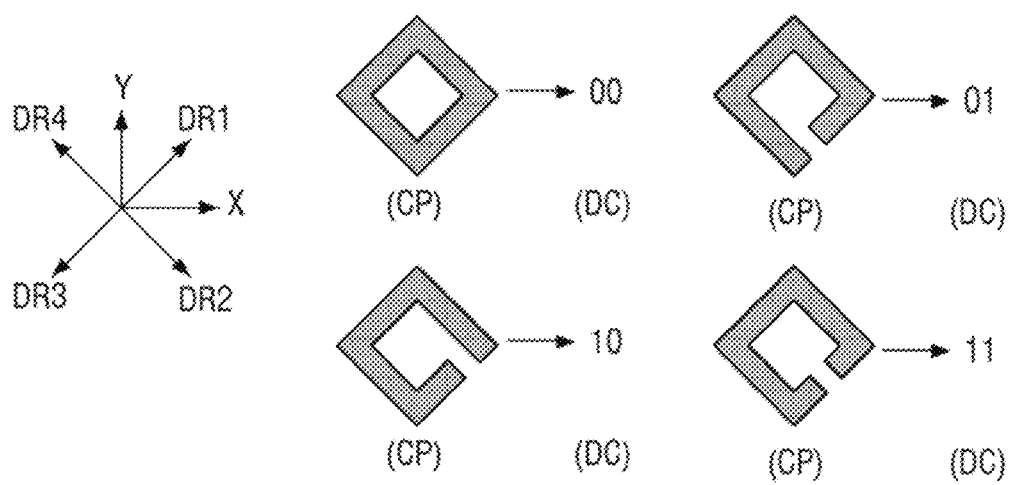

FIG. 26 is a view illustrating an example of a code pattern portion in a display device according to an embodiment of the present disclosure. FIG. 27 is a view illustrating a data code corresponding to the code pattern portion of FIG. 26.

Referring to FIGS. 26 and 27, a plurality of touch electrodes SEN may be formed in a planar mesh structure or a netted structure. Sides of a minimum unit of the plurality of touch electrodes SEN may be extended in the first direction DR1 and the second direction DR2 to cross each other. At least a portion of the plurality of touch electrodes SEN may include a code pattern portion CDP. At least a portion of the plurality of driving electrodes TE or at least a portion of the plurality of sensing electrodes RE may include a code pattern portion CDP.

The code pattern portion CDP may include a reference point RP and a plurality of code patterns CP.

The reference point RP may be an identification reference of the code pattern portion CDP. For example, the reference point RP may correspond to an area where a side constituting a mesh type is fully cut. The reference point RP may include first and second reference points RP1 and RP2. Each of the first and second reference points RP1 and RP2 may be disposed in rows and columns in which a plurality of code patterns CP are arranged. For example, when the code pattern portion CDP is arranged in a 4×3 matrix (4 by 3 matrix), the first reference point RP1 may be disposed in the first row Row1 and the first column Co11, the second reference point RP2 may be disposed in the third row Row3 and the first column Co11, and the plurality of code patterns CP may be arranged in the other rows and columns. The arrangement positions of the reference point RP and the plurality of code patterns CP are not necessarily limited to the above example.

The plurality of code patterns CP may be disposed in a preset area based on the first and second reference points RP1 and RP2. A slope or rotational angle of the plurality of code patterns CP with respect to a camera may be sensed by the first and second reference points RP1 and RP2.

The plurality of code patterns CP may be cut in accordance with a specific reference to have position information. The plurality of code patterns CP may correspond to a value of a preset data code DC. For example, the plurality of code patterns CP may be provided by cutting a specific portion of a side constituting a mesh shape. A position in which a plurality of sides are cut may correspond to the value of the preset data code DC constituting position information. For example, the code pattern CP disposed in the (m)th row and the (n)th column may correspond to the data code DC disposed in the (m)th row and the (n)th column.

For example, the code pattern CP that is not cut may correspond to the data code DC of [00]. The code pattern CP in which a lower portion of a side extended in the first direction DR1 is cut may correspond to the data code DC of [01]. The code pattern CP in which an upper portion of a side extended in the first direction DR1 is cut may correspond to the data code DC of [10]. The code pattern CP in which a central portion of a side extended in the first direction DR1 is cut may correspond to the data code DC of [11].

A 22rd code pattern CP22 disposed in the second row Row2 and the second column Co12 might not be cut, and a 22rd data code DC22 may have a value of [00]. A twelfth code pattern CP12 disposed in the first row Row1 and the second column Co12 may include a side in which a lower portion is cut, and a twelfth data code DC12 may have a value of [01]. A thirteenth code pattern CP13 disposed in the first row Row1 and the third column Co13 may include a side with an upper portion is cut, and a thirteenth data code DC13 may have a value of [10]. A 23rd code pattern CP23 disposed in the second row Row2 and the third column Co13 may include a side in which a central portion is cut, and a 23rd data code DC23 may have a value of [11].

The data code DC arranged in some rows may constitute first data Data1 of coordinate data, and the data code DC arranged in other rows may constitute second data Data2 of the coordinate data. For example, the first data Data1 may correspond to X-axis coordinates of a touch position, and the second data Data2 may correspond to Y-axis coordinates of the touch position, but examples of the first and second data Data1 and Data2 are not necessarily limited thereto.

For example, the data code DC arranged in the first row Row1 and a second row Row2 may constitute the first data Data1 of the coordinate data, and the data code DC arranged in the third row Row3 and the fourth row Row4 may constitute the second data Data2 of the coordinate data. Therefore, the plurality of code patterns CP may be converted into corresponding data codes DC, and the coordinate data may quickly be generated based on the data codes DC without complex calculation and correction.

The display device 10 may include a plurality of code patterns CP provided in at least a portion of the plurality of touch electrodes SEN, thereby receiving a touch input of a touch input device such as a smart pen. The plurality of code patterns CP may be cut in accordance with a specific reference to have position information and may correspond to preset data codes DC in one-to-one correspondence. Therefore, the display device 10 may receive coordinate data generated without complex calculation and correction by using the data codes DC, thereby reducing costs, reducing power consumption and simplifying a driving process. In addition, the display device 10 may include a plurality of code patterns CP provided in at least a portion of the touch electrodes SEN, thereby being applied to all electronic devices having a touch function without restriction in size.

Those skilled in the art will appreciate that many variations and modifications can be made to the described embodiments without substantially departing from the principles of the present disclosure.

What is claimed is:

1. A smart pen, comprising:
    a body portion;
    a pen tip portion disposed on one end of the body portion;
    a code detector detecting shape data by applying light to the pen tip portion and receiving light reflected from a display panel and the pen tip portion though a light receiving portion thereof; and
    a code processor generating coordinate data from the detected shape data and transmitting the generated coordinate data to a processor,
    wherein the pen tip portion includes a reflective surface and the light reflected from the display panel has two paths to the light receiving portion including a first path that is reflected from the reflective surface before arriving at the light receiving portion and a second path that travels directly from the display panel to the light receiving portion.

2. The smart pen of claim 1, wherein the pen tip portion further includes:
    a light emitting portion emitting light,
    a light guide member forming a path for the light emitted from the light emitting portion to guide the light emitted from the light emitting portion out of the pen tip portion; and
    at least one light transmitting port forming a light receiving path for the light reflected from the pen tip portion and the display panel.

3. The smart pen of claim 2, wherein the light emitting portion is disposed on a rear surface of the light guide member, to supply light to the light guide member.

4. The smart pen of claim 3, wherein the light guide member includes:
    a light path forming portion corresponding to a length of the pen tip portion to form a light path for infrared light emitted from the light emitting portion of the pen tip portion; and
    a light incident surface facing the light emitting portion to allow the light emitted from the light emitting portion to be incident thereupon,
    wherein a light output surface is configured to diffuse the light emitted from the light emitting portion, which passes through the light path.

5. The smart pen of claim 4, wherein the light guide member includes a fixing hole formed on one side of the light output surface.

6. The smart pen of claim 4, wherein a length of the light path forming portion corresponds to the length of the pen tip portion.

7. The smart pen of claim 4, further comprising a plurality of optical protrusions formed on the light output surface of the light path forming portion to diffuse and emit light output through the light output surface.

8. The smart pen of claim 7, wherein each of the plurality of optical protrusions has a hemispherical shape, is a polypyramid, is a polyhedron, and/or has an irregular protrusion shape.

9. The smart pen of claim 4, wherein the light output surface of the light guide member is a rectangular shape surface, and light output through the light output surface is diffused and output in a rectangular surface light source shape in accordance with the rectangular shape of the light output surface.

10. The smart pen of claim 9, wherein the pen tip portion allows the light reflected from the display panel to be re-reflected on the reflective surface, thereby forming a light receiving path such that reflective light is received by the light receiving portion of the code detector.

11. The smart pen of claim 2, wherein the light guide member includes:

a plurality of light path forming portions disposed in parallel in a length direction of the pen tip portion to form a path of light generated from a plurality of different light emitting portions;

a plurality of light incident surfaces disposed on a rear surface of each of the plurality of light path forming portions to form a light incident path such that the light generated from the plurality of different light emitting portions is incident upon each of the plurality of light path forming portions; and a light output surface formed in a front direction of the plurality of light path forming portions to condense light passing through the plurality of light path forming portions and diffuse and output the condensed light in the front direction of the plurality of light path forming portions.

12. The smart pen of claim 11, wherein the plurality of different light emitting portions are disposed on a lower surface of a fixed substrate embedded in the body portion or the pen tip portion, to apply infrared light to each of the plurality of light incident surfaces, thereby allowing the infrared light incident upon the plurality of light incident surfaces to be output through the light output surface on a front surface through the plurality of light path forming portions.

13. A smart pen, comprising:
a body portion;
a pen tip portion disposed on one end of the body portion;
a code detector a detecting shape data by applying light to the pen tip portion and receiving light reflected from a display panel and the pen tip portion; and
a code processor generating coordinate data from the detected shape data and transmitting the generated coordinate data to a processor,
wherein the pen tip portion includes:
    a light emitting portion emitting light;
    a light guide member forming a path for the light emitted from the light emitting portion to guide the light emitted from the light emitting portion out of the pen tip portion; and
    at least one light transmitting port forming a light receiving path for the light reflected from the pen tip portion and the display panel,
wherein the light emitting portion is disposed on a rear surface of the light guide member, to supply light to the light guide member,
wherein the light guide member includes:
    a light path forming portion corresponding to a length of the pen tip portion to form a light path for infrared light emitted from the light emitting portion of the pen tip portion; and
    a light incident surface facing the light emitting portion to allow the light from the light emitting portion to be incident thereupon,
    wherein a light output surface is configured to diffuse the light emitted from the light emitting portion, which passes through the light path, and
    wherein the smart pen further comprises a piezoelectric sensor attached to at least one surface of the light guide member, so as to be compressed or relaxed in response to a change in position movement in a front or rear direction of the light guide member.

14. The smart pen of claim 13, wherein the rear surface of the light guide member is supported by an elastic support embedded in the body portion and compressed in a front direction by the elastic support, and the piezoelectric sensor generates a pressurization sensing signal according to a pressurizing force or relaxation level applied by the position movement of the light guide member and transmits the pressurization sensing signal to the code processor.

15. A display system, comprising:
a display panel displaying code patterns or including the code patterns inscribed thereon;
a main processor controlling image display driving of the display panel; and
a smart pen receiving light reflected from the display panel to detect the code patterns, generating coordinate data according to the code patterns and transmitting the coordinate data to the main processor,
wherein the smart pen receives the light reflected from the display panel through two paths including a first path that is reflected from a reflective surface of the smart pen and a second oath that is not reflected from the reflective surface of the smart pen.

16. The display system of claim 15, wherein the smart pen includes:
a body portion;
a pen tip portion formed on one end of the body portion;
a code detector detecting the code patterns by applying light to the pen tip portion and receiving the light reflected from the display panel and the pen tip portion, and a code processor generating the coordinate data and transmitting the coordinate data to the main processor.

17. The display system of claim 16, wherein the pen tip portion of the smart pen includes: a light guide member forming a path for light emitted from a light emitting portion to the pen tip portion; and at least one light transmitting port forming a light receiving path of light reflected from a reflective surface of the pen tip portion and the display panel.

18. The display system of claim 16, wherein the display panel includes a plurality of touch electrodes sensing a touch, and at least a portion of the plurality of touch electrodes includes a code pattern portion in which the code patterns are disposed.

19. The display system of claim 16, wherein the code processor extracts or generates data codes corresponding to a structure and shape of the code patterns through a memory, combines the data codes, and extracts or generates coordinate data corresponding to the combined data codes.

20. The display system of claim 19, wherein the memory stores the data codes and the coordinate data according to combination of the data codes, and shares the data codes respectively corresponding to the code patterns, and the coordinate data according to combination of the data codes with the code processor.

* * * * *